US008165968B2

(12) United States Patent
Ramesh et al.

(10) Patent No.: US 8,165,968 B2
(45) Date of Patent: Apr. 24, 2012

(54) METHOD AND SYSTEM FOR EVALUATING COSTS OF VARIOUS DESIGN AND MAINTENANCE APPROACHES

(75) Inventors: Anapathur V. Ramesh, Bothell, WA (US); Paul M. Covert, Lynnwood, WA (US); Stephen C. Rhodes, Lake Stevens, WA (US); Scott C. Hunter, Bothell, WA (US); John L. Vian, Renton, WA (US); Timothy J. Wilmering, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 1431 days.

(21) Appl. No.: 10/972,916

(22) Filed: Oct. 25, 2004

(65) Prior Publication Data

US 2006/0089920 A1    Apr. 27, 2006

(51) Int. Cl.
*G06Q 99/00* (2006.01)
(52) U.S. Cl. ....... 705/400; 705/1.1; 705/7.12; 705/7.37; 702/184
(58) Field of Classification Search ................ 705/5, 20, 705/26, 1, 7–9, 1.1, 400, 7.26; 700/36, 95, 700/97, 49; 702/81, 185, 184
See application file for complete search history.

(56) References Cited

U.S. PATENT DOCUMENTS

| | | | | |
|---|---|---|---|---|
| 5,907,488 A | * | 5/1999 | Arimoto et al. | 700/97 |
| 6,532,426 B1 | * | 3/2003 | Hooks et al. | 702/81 |
| 6,876,992 B1 | * | 4/2005 | Sullivan | 706/47 |
| 7,082,384 B2 | * | 7/2006 | Sasaki et al. | 702/184 |
| 7,231,374 B1 | * | 6/2007 | Balasinski | 705/400 |
| 8,032,248 B2 | * | 10/2011 | Lee et al. | 700/174 |
| 2003/0149548 A1 | * | 8/2003 | Mosses et al. | 702/184 |
| 2004/0122625 A1 | * | 6/2004 | Nasser et al. | 702/185 |
| 2005/0203858 A1 | * | 9/2005 | Tai et al. | 705/400 |

OTHER PUBLICATIONS

Lamb, Richard G, "Determining True Cost of Maintenance Performance"; Oct. 1996; Pulp & Paper, pp. 93-98.*
Luce, S ; "Choice Criteria In Conditional Preventive Maintenance", Oct. 1997, Mechanical Systems and Signal Processing, 13(1), pp. 163-168.*
Stouffer et al, "Technology Refreshment Cost Estimating and Planning Model: User's Guide", Jun. 2000, Logistics Management Institute, NX001C1, 125 pages.*

(Continued)

*Primary Examiner* — John Hayes
*Assistant Examiner* — Freda A Nelson
(74) *Attorney, Agent, or Firm* — Alston & Bird LLP

(57) ABSTRACT

The method and system quantify the impact of various design and operational solutions for equipment modules of a structure and the overall structure based upon economic factors. In particular, the method and system provide cost evaluation of various maintenance approaches for at least one equipment module that is part of an overall structure. In addition, a baseline and alternate equipment module may be specified for each equipment module. The costs associated with each of the maintenance approaches for each baseline and alternate equipment module then may be compared and the costs associated with the overall structure having a chosen maintenance approach for each baseline and alternate equipment module may be evaluated. The sensitivity of the costs associated with the overall structure to changes in one or more of the parameter values also may be calculated.

27 Claims, 24 Drawing Sheets

OTHER PUBLICATIONS

Kothamasu et al., "Comparison of Selected Model Evaluation Criteria for Maintenance Applications", 2004, Intellegent CAM Systems Laboratory, University of Cinncinati, vol. 3 (3) 0213-224 (12 pgs.).*

Swanson, Laura, "Linking Maintenance Strategies to Performance", 2001, Dept of Management, Southern Illionois University, 237-244 (8 pgs).*

Dean Hooks and Chris Reisig, "Integrated Vehicle Health Management", Oct. 2002, NDIA 5th Annual Systems Engineering Conference, Boeing Phantom Works, 18 pgs.*

Stouffer et al, "Technology Refreshment Cost Estimating and Planning Model: Users Guide", Jun. 2000, Logistics Management Institute, NX001C1, 125 pages.*

Lamb, Richard G, "Determining True Cost of Maintenance Performance Can Generate New Profits" o Oct. 1996 o Pulp & Paper, pp. 93-98.*

Luce, S, "Choice Criteria in Conditional Preventive Maintenance", Oct. 1997, Mechanical Systems and Signal Processing, 13(1), pp. 163-168.*

* cited by examiner

| Aircraft Level Inputs (OEM Defaults) | Model A | Model B | Model C | Model D | Parameter Name |
|---|---|---|---|---|---|
| 1. Aircraft Model | | | | | Program |
| 2. Aircraft Fleet Size | 30 | 25 | 15 | 50 | Fleetsize |
| 3. Average Number of Flights per Year per Plane | 1000 | 900 | 700 | 1700 | NumFlightsperYearperPlane |
| 4. Average Flight Hours per Flight | 3.60 | 4.20 | 5.80 | 1.60 | FlightHoursperFlight |
| 5. Average Delay Cost per Delay Hour | $10,500 | $20,000 | $13,500 | $4,700 | DelayCostperDelayHour |
| 6. Average Cancellation Cost per Cancellation | $52,000 | $97,400 | $65,900 | $23,500 | CancelCostperCancellation |
| 7. Average Air Turnback Cost per Turnback | $37,400 | $61,200 | $48,300 | $18,900 | TurnbackCostperTurnback |
| 8. Average Diversion Cost per Diversion | $43,900 | $75,200 | $59,800 | $22,100 | DiversionCostperDiversion |
| 9. Out of Service Cost per Day | $71,500 | $65,900 | $65,900 | $53,800 | OutOfServiceCostperDay |
| 10. Lbs Fuel Burned / Flight Hour / Lb Additional Weight | 0.0305 | 0.0246 | 0.0342 | 0.0595 | FuelBurnFactorWeight |

| Aircraft Level Inputs (User-Defined) | | | | | Parameter Name |
|---|---|---|---|---|---|
| 1. Aircraft Program | | | | | Program |
| 2. Aircraft Fleet Size | | | | | Fleetsize |
| 3. Average Number of Flights per Year per Plane | | | | | NumFlightsperYearperPlane |
| 4. Average Flight Hours per Flight | | | | | FlightHoursperFlight |
| 5. Average Delay Cost per Delay Hour | | | | | DelayCostperDelayHour |
| 6. Average Cancellation Cost per Cancellation | | | | | CancelCostperCancellation |
| 7. Average Air Turnback Cost per Turnback | | | | | TurnbackCostperTurnback |
| 8. Average Diversion Cost per Diversion | | | | | DiversionCostperDiversion |
| 9. Out of Service Cost per Day | | | | | OutOfServiceCostperDay |
| 10. Lbs Fuel Burned / Flight Hour / Lb Additional Weight | | | | | FuelBurnFactorWeight |

FIG. 4

| AIRCRAFT LEVEL INPUTS | UNITS | BASELINE | ALTERNATE | Parameter Name |
|---|---|---|---|---|
| 1. Aircraft Program | | Model B | Model B | Program |
| 2. Aircraft Fleet Size | | 25 | 25 | Fleetsize |
| 3. Average Number of Flights per Year per Plane | Flights/Year/Aircraft | 900 | 900 | NumFlightsperYearperPlane |
| 4. Average Flight Hours per Flight | Flight Hours/Flight | 4.20 | 4.20 | FlightHoursperFlight |
| 5. Average Delay Cost per Delay Hour | USD | $20,000 | $20,000 | DelayCostperDelayHour |
| 6. Average Cancellation Cost per Cancellation | USD | $97,400 | $97,400 | CancelCostperCancellation |
| 7. Average Air Turnback Cost per Turnback | USD | $61,200 | $61,200 | TurnbackCostperTurnback |
| 8. Average Diversion Cost per Diversion | USD | $75,200 | $75,200 | DiversionCostperDiversion |
| 9. Out of Service Cost per Day | USD | $12,800 | $12,800 | OutOfServiceCostperDay |
| 10. Lbs Fuel Burned / Flight Hour / Lb Additional Weight | Lbs/Flight Hour/Lbs | 0.024600 | 0.024600 | FuelBurnFactorWeight |

FIG. 5

| SYSTEM LEVEL INPUTS | UNITS | BASELINE | ALTERNATE | Parameter Name |
|---|---|---|---|---|
| 11. System Name | | | | Name |
| 12. Year of Delivery of the System | | | | YearOfSystemDelivery |
| 13. System Acquisition Cost Base Year (per fleet) | USD/Fleet | | | SysAcqCostPerFleet |
| 14. Increase in System Acquisition Cost Due to Prognostics | USD/Fleet | | | SysProgCostPerFleet |
| 15. System Support Equipment Cost, Base Year (per fleet) | USD/Fleet | | | SysSupportEquipCostPerFleet |
| 16. System Initial Training Cost, Base Year (per fleet) | USD/Fleet | | | SysInitTrainingCostPerFleet |
| 17. Length of System Life in Years (1-20 yrs.) | Years | 20 | 20 | SystemLife |

FIG. 6

| Economic Input Parameters | OEM Default | User Default 1 | User Default 2 | Parameter Name |
|---|---|---|---|---|
| Average Fuel Inflation Rate Beyond Present Year | 3.50% | | | FuelInflationRate |
| Average Non-fuel Inflation Rate Beyond Present Year | 3.50% | | | NonFuelInflationRate |
| Insurance Factor (Normally Zeroed Out) | 0.00% | | | InsuranceFactor |
| Minimum Attractive Rate of Return | 12.00% | | | MinRateOfReturn |
| Spares Holding Factor | 12.00% | | | SparesHoldingFactor |
| Maintenance Labor Burden Factor | 2.30 | | | MaintLaborBurdenFactor |
| Direct Labor Rate per Hour | $22.75 | | | DirectLaborRate |
| Fuel Cost per Gallon, Base Year | $0.66 | | | FuelCost |

FIG. 7

| | ECONOMIC FACTORS (REQUIRES ANNUAL UPDATE) | UNITS | BASELINE | ALTERNATE | Parameter Name |
|---|---|---|---|---|---|
| 18 | Average Fuel Inflation Rate Beyond Present Year | Percent | 3.5% | 3.5% | FuelInflationRate |
| 19 | Average Non-fuel Inflation Rate Beyond Present Year | Percent | 3.5% | 3.5% | NonFuelInflationRate |
| 20 | Insurance Factor (Normally Zeroed Out) | Percent | 0.00% | 0.00% | InsuranceFactor |
| 21 | Minimum Attractive Rate of Return | Percent | 12% | 12% | MinRateOfReturn |
| 22 | Spares Holding Factor | Percent | 12% | 12% | SparesHoldingFactor |
| 23 | Maintenance Labor Burden Factor | | 2.3 | 2.3 | MaintLaborBurdenFactor |
| 24 | Direct Labor Rate per Hour | USD | $22.75 | $22.75 | DirectLaborRate |
| 25 | Fuel Cost per Gallon, Base Year | USD/Gallon | $0.66 | $0.66 | FuelCost |

FIG. 8

| DETAILED PART INPUT SECTION | UNITS | BASELINE PART 1 | BASELINE PART 2 | ALTERNATE PART 1 | ALTERNATE PART 2 | Parameter Name |
|---|---|---|---|---|---|---|
| PART INFORMATION | | | | | | |
| 26 Part Number | | 1234 | 5678 | 1234 | 5678 | PartNumber |
| 27 Part Description | | Equip. Mod.1 | Equip. Mod. 2 | Equip. Mod. 1 | Equip. Mod. 2 | PartDescription |
| 28 Quantity per Aircraft | | 2 | 1 | 2 | 1 | qpa |
| Enter 'NO' to omit Scheduled Approach Calculations for this LRU | | | NO | | NO | |
| Enter 'NO' to omit Prognostics Approach Calculations for this LRU | | | | | | |
| Operate to Failure (OTF) inputs (i.e. Unscheduled maintenance) | UNITS | BASELINE | BASELINE | ALTERNATE | ALTERNATE | |
| Parts Maintenance Events | | 1 | 2 | 1 | 2 | |
| 29 Unscheduled Removal NFF (Unjustified Removal) Rate | Percent | 20% | 50% | 20% | 50% | OTFNFF |
| 30 Mean Time Between Failures in Flight Hours (Interval) | Flight Hours | 8,000 | 15,000 | 8,000 | 15,000 | OTFMTBF |
| 31 Part Failure Time Distribution | see note | NORMAL | EXPONENTIAL | NORMAL | EXPONENTIAL | OTFPartFailTimeDistribution |
| 32 Shape Factor (for WEIBULL) or Standard Deviation (for NORMAL) | Flight Hours | 2700 | | 2700 | | OTFBeta |
| 33 Maintenance Actions per 1000 Flight Hrs. (Non Removals) | | .02 | | 0.02 | | OTFMaintActions |
| Part Maintenance Labor Materials | UNITS | BASELINE | BASELINE | ALTERNATE | ALTERNATE | |
| 34 Line Labor Hours per Removal | Labor Hours | 2 | 2 | 2 | 1 | OTFLineLbrHrsPerRmvl |
| 35 Line Labor Hours per Maintenance Action (Non Removal) | Labor Hours | 2 | 1 | 2 | 1 | OTFLineLbrHrsPerMaintAct |
| 36 Shop Labor Hours per Failure (Repair and Test) | Labor Hours | 20 | 7 | 20 | 7 | OTFShopLbrHrsPerFailure |
| 37 Shop Labor Hours per Unconfirmed Failure (Test Time) | Labor Hours | 4 | 3 | 4 | 3 | OTFShopLbrHrsPerUncfmFailure |
| 38 Average Shop Material Cost per Failure, Base Year | USD | #3,000 | 1,200 | 3,000 | 1,200 | OTFAvgShopMatlCostPerFailure |
| Schedule Interruptions | per failure | 1 | 2 | 1 | 2 | |
| 39 "Out of Service Days" per Failure | per failure | | | | | OTFSIOutOfServiceDaysRate |
| 40 Delay Rate per UnScheduled Removal | per removal | .03 | .005 | 0.03 | 0.005 | OTFDelaysRate |
| 41 Cancellation Rate per Failure | per failure | .0005 | | 0.0005 | | OTFCancellationsRate |
| 42 Air Turnback Rate per Failure | per failure | | | | | OTFATBRate |
| 43 Diversion Rate per Failure | per failure | | | | | OTFDiversionsRate |
| 44 Average Delay Time (HOURS) | Hours | 1 | .5 | 1 | 0.5 | OTFAvgDelayTime |

| FIG. 9A |
|---|
| FIG. 9B |
| FIG. 9C |

FIG. 9

FROM FIG. 9A

| | DETAILED PART INPUT SECTION | UNITS | BASELINE PART 1 | BASELINE PART 2 | ALTERNATE PART 1 | ALTERNATE PART 2 | Parameter Name |
|---|---|---|---|---|---|---|---|
| | PART INFORMATION | | | | | | |
| | Spares | | | | | | |
| 45 | Cost / Spare Unit, Base Year | USD | $50,000 | $80,000 | $60,000 | $80,000 | OTFSparePrice |
| 46 | Is the term expendable? (YES or NO) | Yes or No | no | no | no | no | OTFSparesExpendable |
| 47 | Will the operator require spares of this LRU (enter YES or NO) | Yes or No | yes | yes | yes | yes | OTFSparesReqd |
| 48 | Shop Turn Around Time in Days (default=14-elec or 34-mech) | Days | 34 | 2.5 | 34 | 21 | OTFSparesTurnAroundTime |
| 49 | Main Base Fill Rate (Must be Less Than One) | | .9 | .95 | .09 | 0.95 | OTFSparesMainBaseFillRate |
| | Fuel Burn Information | | | | | | |
| 50 | Part Weight | Lbs | | | | | OTFPartWeight |
| 51 | Fuel Burn Due to Horsepower | see note | | | | | OTFPartDirectHPRqmt |
| 52 | Pounds of Fuel per Block Trip | see note | | | | | OTFPartLbsOfFuelPerBlockTrip |
| | Unique Scheduled Removal Inputs | | BASELINE | BASELINE | ALTERNATE | ALTERNATE | |
| | Part Maintenance Events | UNITS | 1 | 2 | 1 | 2 | |
| 53 | Mean Time Between Overhauls (optomized value or manual entry) | Flight Hours | | | | 0.01 | SRMTBO |
| | Part Maintenance Labor / Materials | UNITS | | | | | |
| 54 | Shop Labor Hours per Overhaul | Labor Hours | 17 | | 17 | | SRLaborHrsPerOverhaul |
| 55 | Average Material per Overhaul | USD | $2,500 | | $2,500 | | |

FROM FIG. 9A

| | DETAILED PART INPUT SECTION | | BASELINE PART 1 | BASELINE PART 2 | ALTERNATE PART 1 | ALTERNATE PART 2 | Parameter Name |
|---|---|---|---|---|---|---|---|
| | PART INFORMATION | | | | | | |
| | Unique Prognostic Inputs | | | | | | |
| 56 | Prognostic Part Maintenance Events | UNITS | | | | | |
| 57 | Prognostic Correct Failure Predication and False Alarm Percentage | Correct % | 0.64 | | 0.64 | | ProgSuccessPcnt |
| | | False % | 0.1 | | 0.1 | | ProgFalseAlarmsPerRmvl |
| | Prognostic Part Maintenance Labor / Materials | UNITS | | | | 7 | |
| 58 | Shop Labor Hours per Justified Prognostic Removal | Labor Hours | 15 | | 15 | | ProgShopLaborHrsPerJustRmvl |
| 59 | Average Shop Material Cost per Justified Prognostic Removal | USD | $2,000 | | $2,000 | $1,250 | ProgShopMatlCostPerJustRmvl |
| 60 | Additional Prognostics Cost / 1000 Rt Hrs | USD/1000 | $10 | | $10 | | ProgRecurrCost |
| | Prognostic Spares | UNITS | | 2 | | 2 | |
| 61 | Cost / Prognostic Spare Unit, Base Year | USD | $55,000 | $84,000 | $55,000 | $84,000 | ProgCostPerUnit |
| 62 | Prognostics Quantity per aircraft (QPA) | | 2 | 1 | 2 | 1 | progQPA |
| | Prognostic Fuel Burn Information | UNITS | | | | | |
| 63 | Part Weight | Lbs. | 1 | | 1 | | progPartWeight |
| 64 | Fuel Burn Due to Horsepower | see note | | | | | ProgPartDirectHPRqmt |
| 65 | Pounds of Fuel Burn Per Block Trip | see note | | | | | ProgPartLbsOfFuelPerBlock |

64 { (brace covering rows 56–65)

FIG. 9C

| BASELINE | Equipment Module 1 | | | Equipment Module 2 | | |
|---|---|---|---|---|---|---|
| Part Description | OTF | Scheduled | Prognostic | OTF | Scheduled | Prognostic |
| Maintenance Approach | | MTBO=N/A | | | MTBO=N/A | |
| Operating + Spares Life Cycle Cost NPV - XX Years | | | | | | |
| Fuel | $0 | $0 | $4,649 | $0 | $0 | $0 |
| Line Maintenance | $49,393 | $49,393 | $40,766 | $10,065 | $0 | $10,065 |
| Shop Maintenance | $1,051,538 | $1,051,538 | $839,407 | $130,763 | $0 | $130,763 |
| Schedule Interruption | $186,525 | $186,525 | $61,115 | $6,704 | $0 | $6,704 |
| Spares | $539,943 | $539,943 | $593,937 | $345,564 | $0 | $362,842 |
| Expendable Material | | | $0 | | $0 | $0 |
| Sustaining Prognostics | | | $19,330 | | $0 | $0 |
| Total | $1,827,399 | $1,827,399 | $1,559,204 | $493,096 | $0 | $510,374 |
| Select one desired maintenance approach per LRU (to be used in the final analysis) | ○ | ○ | ● | ● | ○ | ○ |

FIG. 16A

| ALTERNATE | Equipment Module 1 | | | Equipment Module 2 | | |
|---|---|---|---|---|---|---|
| Part Description | OTF | Scheduled | Prognostic | OTF | Scheduled | Prognostic |
| Maintenance Approach | | MTBO=N/A | | | MTBO=N/A | |
| Operating + Spares Life Cycle Cost NPV - XX Years | | | | | | |
| Fuel | $0 | $0 | $4,649 | $0 | $0 | $0 |
| Line Maintenance | $49,393 | $49,393 | $40,766 | $10,065 | $0 | $10,065 |
| Shop Maintenance | $1,051,538 | $1,051,538 | $839,407 | $130,763 | $0 | $130,763 |
| Schedule Interruption | $186,525 | $186,525 | $61,115 | $6,704 | $0 | $6,704 |
| Spares | $539,943 | $539,943 | $593,937 | $345,564 | $0 | $362,842 |
| Expendable Material | | | $0 | | $0 | $0 |
| Sustaining Prognostics | | | $19,330 | | $0 | $0 |
| Total | $1,827,399 | $1,827,399 | $1,559,204 | $493,096 | $0 | $510,374 |
| Select one desired maintenance approach per LRU (to be used in the final analysis) | ● | ○ | ○ | ● | ○ | ○ |

FIG. 16B

| BASELINE Part Description | Equipment Module 1 | Equipment Module 2 | Totals |
|---|---|---|---|
| Maintenance Approach | Prognostics | Operate To Failure | |
| Total Life Cycle Cost - NPV [XX Years] | | | |
| Acquisition Costs (less Spares Provisioning) | | | $0 |
| Fuel | $4,649 | $0 | $4,649 |
| Line Maintenance | $40,766 | $10,065 | $50,831 |
| Shop Maintenance | $839,407 | $130,763 | $970,170 |
| Scheduled Interruption | $61,115 | $6,704 | $67,819 |
| Spares | $593,937 | $345,564 | $939,501 |
| Expendable Material | $0 | $0 | $0 |
| Sustaining Prognostics | $19,330 | | $19,330 |
| Total | $1,559,204 | $493,096 | $2,052,300 |

FIG. 19A

| ALTERNATE Part Description | Equipment Module 1 | Equipment Module 2 | Totals |
|---|---|---|---|
| Maintenance Approach | Operate To Failure | Operate To Failure | |
| Total Life Cycle Cost - NPV [XX Years] | | | |
| Acquisition Costs (less Spares Provisioning) | $0 | $0 | $0 |
| Fuel | | | $0 |
| Line Maintenance | $49,393 | $10,065 | $59,459 |
| Shop Maintenance | $1,051,538 | $130,763 | $1,182,301 |
| Scheduled Interruption | $186,525 | $6,704 | $193,228 |
| Spares | $539,943 | $345,564 | $885,507 |
| Expendable Material | $0 | $0 | $0 |
| Sustaining Prognostics | $0 | $0 | $0 |
| Total | $1,827,399 | $493,096 | $2,320,494 |

FIG. 19B

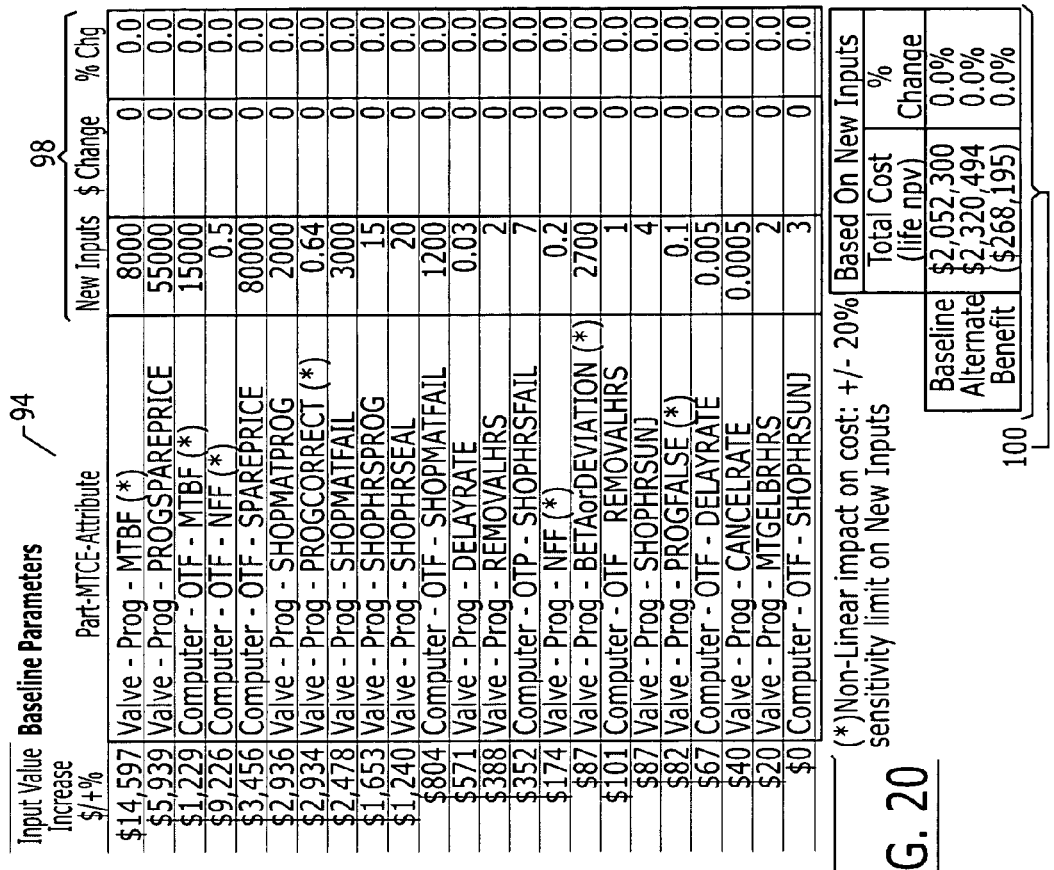
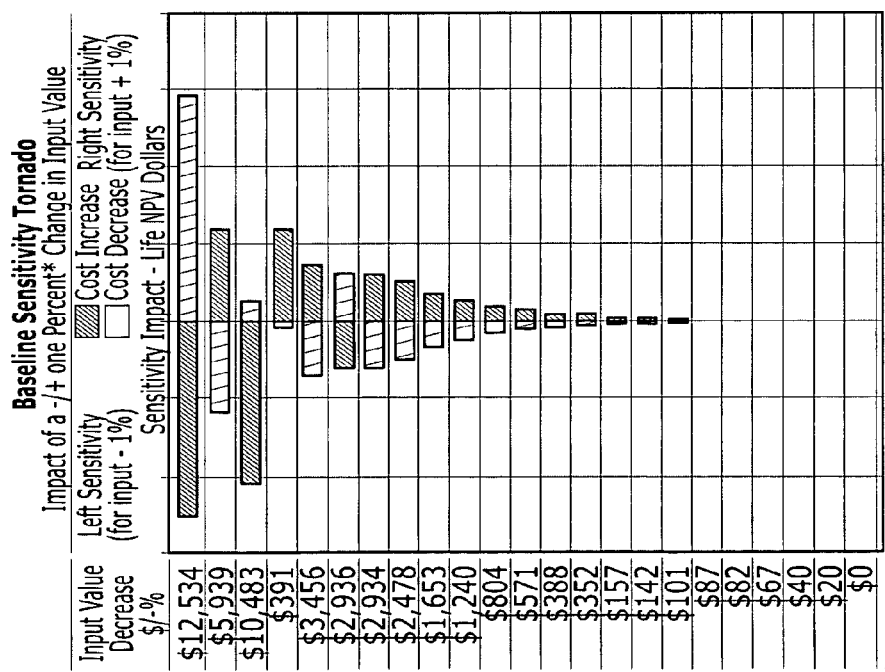
FIG. 20

Cost Benefit Analysis

Title: Equipment Module Study  
Program: Model B  
System Name:  
Study Year: 3.50%  
Non-Fuel Inflation:  
Analyst:

Date: 07/31/2003  
Life Cycle: 20  
Fleet Size: 25  
Fuel Inflation: 3.50%  
Discount Rate: 12.00%

| Number of LRU's in study | Baseline | Alternate |
|---|---|---|
| Operate to Failure | 1 | 2 |
| Scheduled | 0 | 0 |
| Prognostics | 1 | 0 |

| | Baseline | Alternate | Benefit (Cost) |
|---|---|---|---|
| Acquisition Costs (Fleet) | | | |
| System Acquisition Cost | $0 | $0 | $0 |
| System Support Equipment Cost | $0 | $0 | $0 |
| System Training Cost | $0 | $0 | $0 |
| Initial Spares Provisioning Costs | $435,000 | $410,000 | $25,000 |
| Total Acquisition Costs (Fleet) | $435,000 | $410,000 | $25,000 |
| Sustaining/Operating Costs (Fleet) | | | |
| Fuel Cost | $4,649 | $0 | $4,649 |
| Due to Weight | $4,649 | $0 | $4,649 |
| Due to Power Extraction | $0 | $0 | $0 |
| Base Fuel | $0 | $0 | $0 |
| Maintenance Costs | $1,040,330 | $1,241,759 | ($201,429) |
| Line Maintenance Labor | $50,831 | $59,459 | ($8,627) |
| Shop Maintenance Labor | $348,338 | $413,650 | ($65,312) |
| Shop Material | $621,832 | $768,651 | ($146,819) |
| Expendable Material | $0 | $0 | $0 |
| Additional Prognostics | $19,330 | $0 | $19,330 |
| Schedule Interruption Costs | $67,819 | $193,228 | ($125,409) |
| Delay Costs | $63,797 | $182,056 | ($118,259) |
| Cancellation Costs | $4,022 | $11,172 | ($7,150) |
| Air Turnback Costs | $0 | $0 | $0 |
| Diversion Costs | $0 | $0 | $0 |
| Out of Service Costs | $0 | $0 | $0 |
| Spares Holding Costs | $504,501 | $475,507 | $28,994 |
| Insurance Cost | $0 | $0 | $0 |
| Total Sustaining/Operating Costs (Fleet) | $1,617,300 | $1,910,494 | ($293,195) |
| Total Costs (Present Value - Fleet over Life Cycle: Years) | $2,052,300 | $2,320,494 | ($268,195) |
| Total Acquisition Costs, NPV per Airplane | $17,400 | $16,400 | $1,000 |
| Total Sustaining/Operational Costs, NPV per Aircraft | $82,092 | $92,820 | ($10,728) |
| Cost/Benefit per Aircraft (Present Value over 20 Years) | $99,492 | $109,220 | ($9,728) |
| Total Cost/Benefit per Aircraft per Year (Non Inflated, Non Discounted Cash Flow) | $45,545 | $41,679 | $3,867 |

FIG. 21

METHOD AND SYSTEM FOR EVALUATING COSTS OF VARIOUS DESIGN AND MAINTENANCE APPROACHES

FIELD OF THE INVENTION

The method and system of the present invention quantify the Life Cycle Cost (LCC) impact of various design and operational solutions. In particular, the method and system provide cost evaluation of various design and maintenance approaches for at least one equipment module that is part of an overall structure. In addition, a baseline and alternate design solution may be specified for each equipment module. The costs associated with each of the design/maintenance approaches for each baseline and alternate equipment module then may be compared and the costs associated with the overall structure having a chosen maintenance approach for each baseline and alternate equipment module may be evaluated.

BACKGROUND OF THE INVENTION

It is common for equipment modules to be designed and operated according to different maintenance approaches. For example, it is conventional for an equipment module, which may be an individual component, a component within a system, or a system of components, to be designed and operated in accordance with one of an "operate-to-failure maintenance approach" or a "scheduled maintenance approach."

The scheduled maintenance approach refers to a process of replacing or servicing an equipment module at a scheduled interval, such as an interval based on hours of use. The goal of the scheduled maintenance approach is to schedule maintenance intervals so that equipment modules are serviced or replaced before they fail, so that failure is avoided. If maintenance intervals are scheduled too frequently, the benefits resulting from the performed maintenance may be offset by excessive maintenance expenses. If maintenance intervals are not scheduled frequent enough, the benefits resulting from the performed maintenance may be offset by excessive failures of equipment modules.

The operate-to-failure maintenance approach refers to operating an equipment module until failure, without using the scheduled maintenance approach or the prognostic maintenance approach. The equipment module is replaced after it fails. Depending upon the type of equipment module, the operate-to-failure maintenance approach may include more than just the cost of replacing the failed equipment module because the failure of one equipment module may cause collateral damage also. For example, if a bearing of an engine is allowed to totally fail, then the lack of the bearing may cause the housing or shaft of the engine to also be damaged or fail.

In addition to the scheduled maintenance approach and the operate-to-failure maintenance approach, it is also advantageous to consider and evaluate a "prognostic maintenance approach" for an equipment module. The prognostic maintenance approach refers to a process of prognosticating (that is, using present indications as a guide) to predict a failure in advance. The prognostic maintenance approach typically requires monitoring characteristics of the equipment module that can provide an indication of an impending problem with the equipment module. In some cases, the equipment module must be designed in a manner that facilitates the monitoring of the characteristic(s) that are of interest. The goal of the prognostic maintenance approach may be to replace an equipment module just prior to a predicted failure of that equipment module. Alternatively, the goal may be to replace or service an equipment module just prior to the equipment module being degraded to a point at which the cost of the replacement or servicing becomes excessive. If too much effort is put into a prognostic maintenance approach, the benefits resulting therefrom may be offset or outweighed by excessive expenses associated with the prognosticating. If insufficient efforts are put into a prognostic maintenance approach, then the benefits resulting therefrom may be offset or outweighed by excessive failures of equipment modules.

The general concepts of the operate-to-failure maintenance approach, the prognostic maintenance approach, and the scheduled maintenance approach are well known, but it can be difficult to select between these maintenance approaches when designing or operating an equipment module. In addition, although there are systems that quantify the cost associated with these maintenance approaches by taking certain basic factors regarding the equipment module into consideration, these systems perform the quantification for each equipment module separately, such that the quantification must be performed numerous times for each equipment module. Furthermore, conventional quantification systems often require only rough estimates of inputs regarding the equipment module and do not take into account any type of economic factors, such that the quantification of cost of the equipment module with one of the maintenance approaches provides a rough amount that can be analyzed relative to the quantifications of other equipment modules and/or other maintenance approaches, but the costs are generally not very accurate. As a result, designers and operators of equipment modules often do not have accurate quantifications to optimally select from the operate-to-failure maintenance approach, the prognostic maintenance approach, the scheduled maintenance approach or other approaches, such that it is common for the design and operation of equipment modules to be less than optimal.

BRIEF SUMMARY OF THE INVENTION

The method and system for evaluating costs associated with various maintenance approaches of the present invention provide accurate quantification of the LCC impact of various design and operational solutions based upon reliability, maintenance, operations, mission parameters and economic factors. In particular, the method and system provide cost evaluation of various design/maintenance approaches for at least one equipment module that is part of an overall structure in one transaction, instead of many as required by the conventional quantification systems. In addition, a baseline and alternate equipment module may be specified for each equipment module to determine which equipment module is optimal for a particular system. The costs associated with each of the design/maintenance approaches for each baseline and alternate equipment module then may be compared and the costs associated with the overall structure having a chosen design/maintenance approach for each baseline and alternate equipment module may be evaluated. Furthermore, the method and system of the present invention are capable of calculating the sensitivity of the costs based upon a change in an input parameter, such that the relative impact of certain input parameters on the costs can be determined. Thus, the method and system for evaluating costs associated with various maintenance approaches of the present invention provide accurate and comprehensive analyses of costs associated with various maintenance approaches, such that users save time and arrive at a more optimal design solution than with conventional quantification systems.

One embodiment of the method and system for evaluating costs associated with various maintenance approaches, such as a prognostic maintenance approach, a scheduled maintenance approach and an operate-to-failure maintenance approach, for at least one equipment module of a structure includes receiving multiple parameters, such as via a client element, determining costs associated with each of at least two of the maintenance approaches for each equipment module based upon the parameters, such as via a processing element, and presenting the costs, such as via a display element. In another embodiment, costs associated with the prognostic maintenance approach only are evaluated. The parameters include parameters regarding the equipment module(s), the structure and economic factors related to the equipment module(s), including, for example, a plurality of non-recurring costs, such as acquisition and training costs, and recurring costs, such as any sustaining costs, associated with each maintenance approach for each equipment module. The parameters and costs may be stored, such as in a storage element.

In some embodiments of the present invention, the parameters may include information regarding a lifetime of the structure and the costs may be determined by determining the non-recurring costs, such as acquisition and training costs, and recurring costs, such as sustaining costs, associated with each maintenance approach for each equipment module over the lifetime of the structure.

In further embodiments, a selection of one of the maintenance approaches for each equipment module may also be received, all the costs, such as all of the acquisition and sustaining costs, for the structure may be determined based upon the selected maintenance approach for each equipment module and all the costs may be presented. Some embodiments may also include determining a sensitivity value for at least one of the plurality of parameters following receipt of the selection of one of the maintenance approaches for each equipment module. The sensitivity value for a respective parameter may be the change in the costs resulting from a change in the value of the respective parameter by a predetermined percentage.

After determining the sensitivity value, at least one modified parameter may be received and the costs associated with each of at least two of the maintenance approaches may be determined based upon the parameters, including the modified parameter(s). A selection of one of the maintenance approaches for each equipment module then may be received, and a modified sensitivity value for one or more of the parameters, including the modified parameter(s), may be determined.

To determine the costs associated with each maintenance approach for each equipment module and/or all of the costs for the structure having the selected maintenance approach for each equipment module according to certain embodiments of the present invention, the respective net present life cycle costs may be determined.

Other embodiments of the method and system of the present invention include receiving parameters regarding at least one first equipment module and parameters regarding at least one second equipment module, which is an alternative for a respective first equipment module. In this embodiment, the costs associated with each of at least two maintenance approaches are determined for each of the first and second equipment modules. A selection of one of the maintenance approaches for each of the first equipment modules and each of the second equipment modules then may be received, and first costs of the structure based upon the selected maintenance approach for each first equipment module and second costs of the structure based upon the selected maintenance approach for each second equipment module may be determined and presented.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 illustrates a chart of the default input parameters for a structure, when the structure is an aircraft according to one embodiment of the present invention;

FIG. 5 illustrates an example of a selection of a structure (aircraft Model B) default input parameters for both a baseline evaluation and any alternate evaluation according to one embodiment of the present invention;

FIG. 6 illustrates the system level input parameters according to one embodiment of the present invention;

FIG. 7 illustrates the economic input parameters according to one embodiment of the present invention;

FIG. 8 illustrates a selection of the default economic input parameters to utilize for both the baseline and any alternate analyses according to one embodiment of the present invention;

Figure 10:
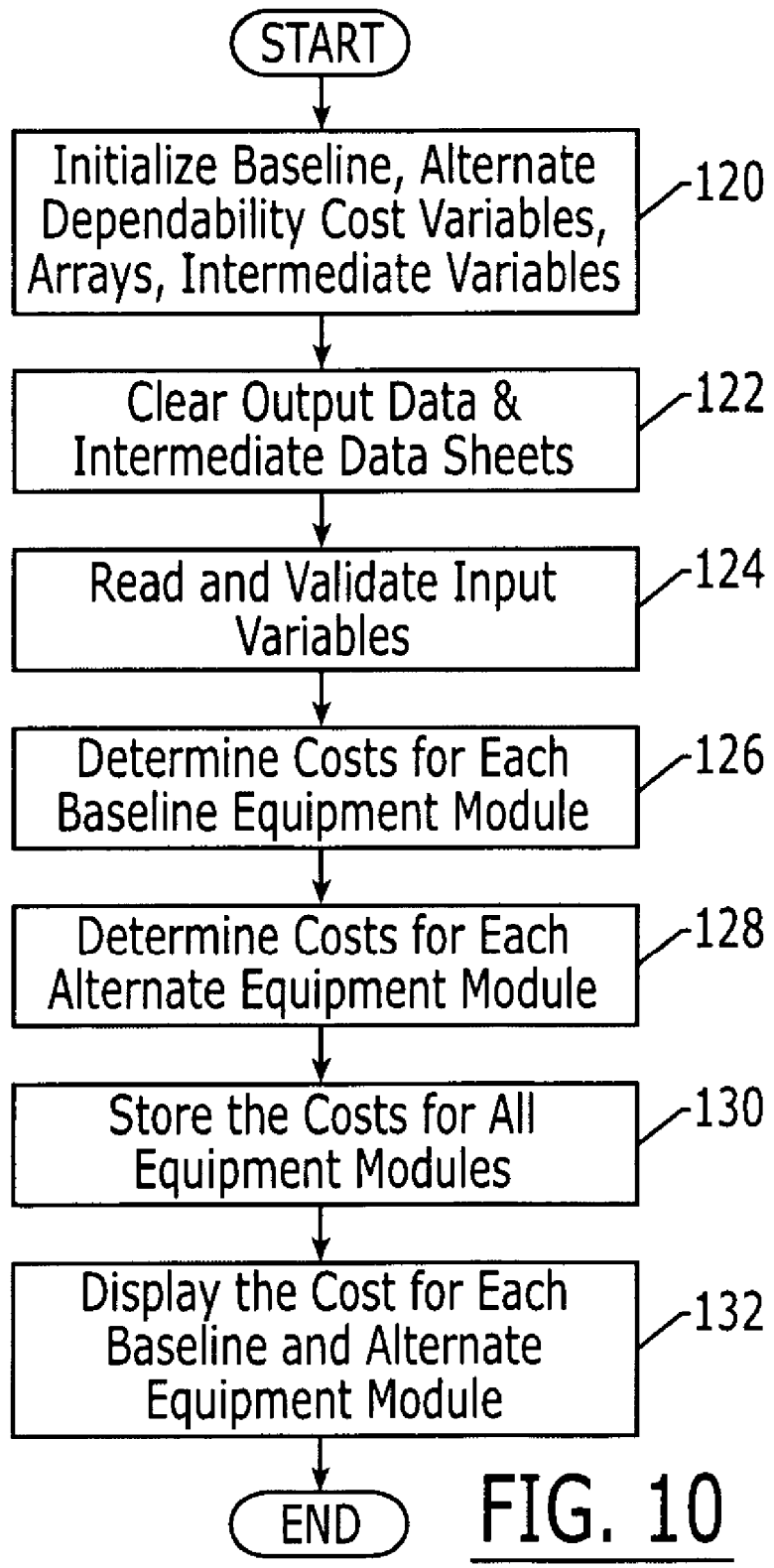
Figure 11:
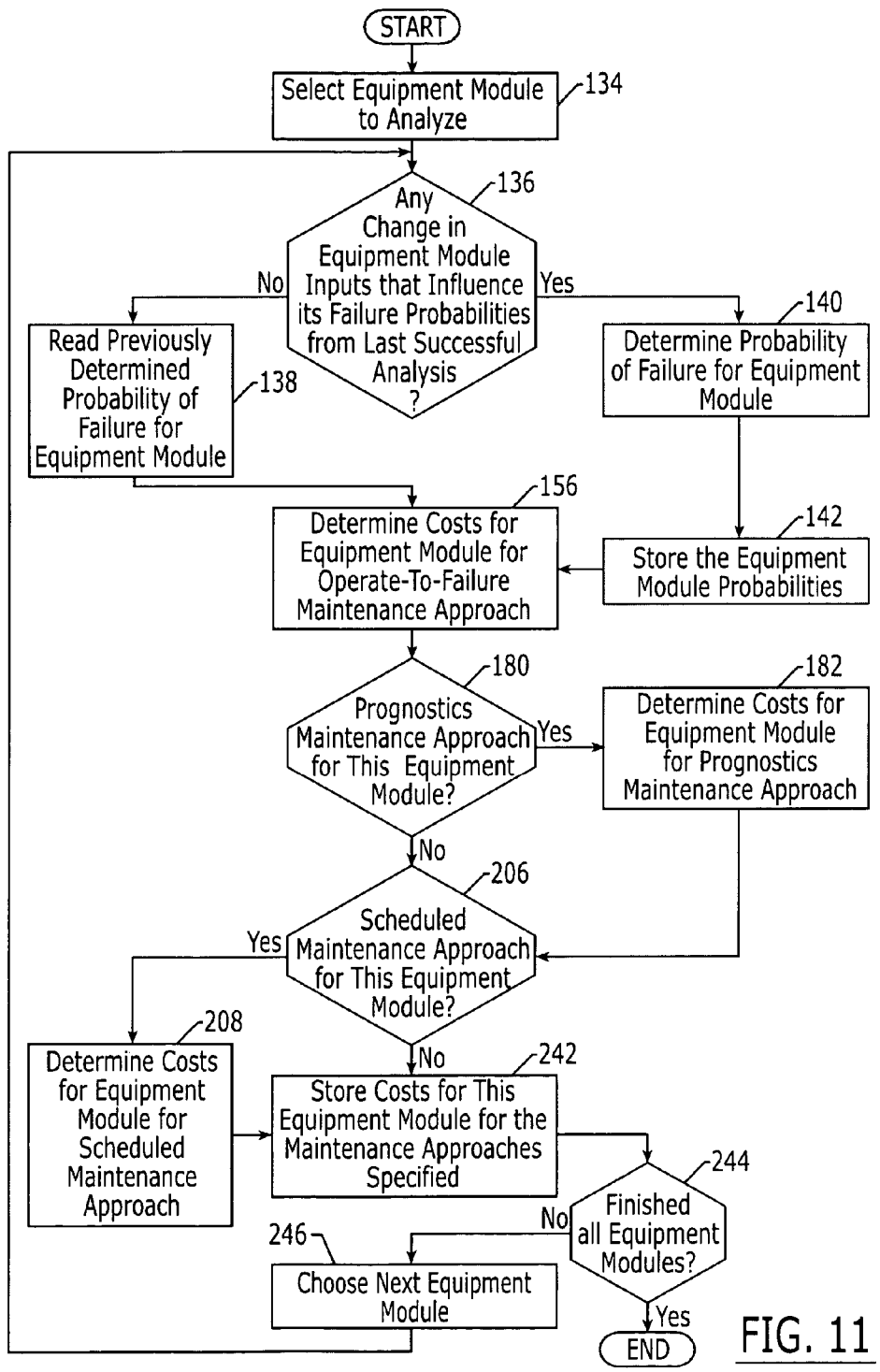
Figure 12:
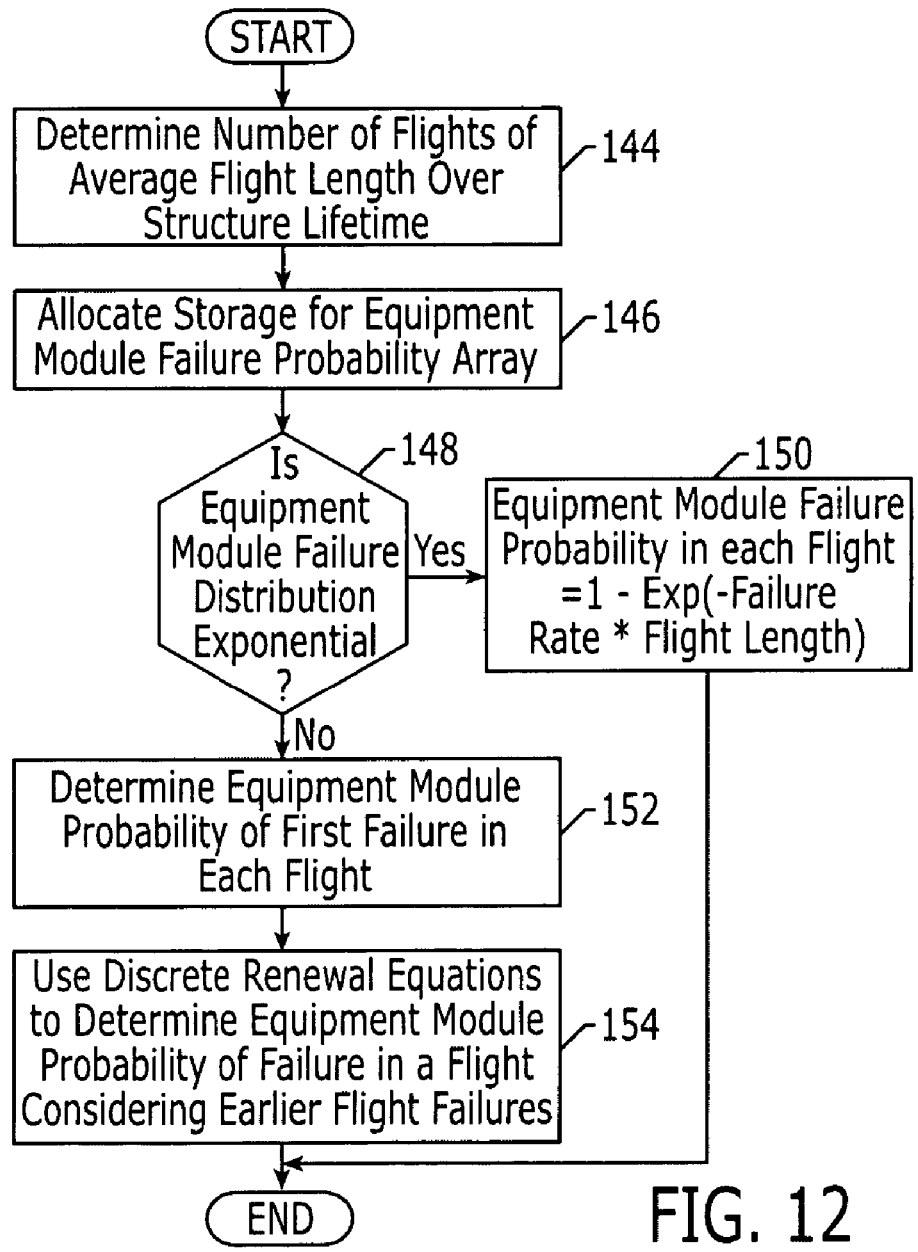
Figure 13:
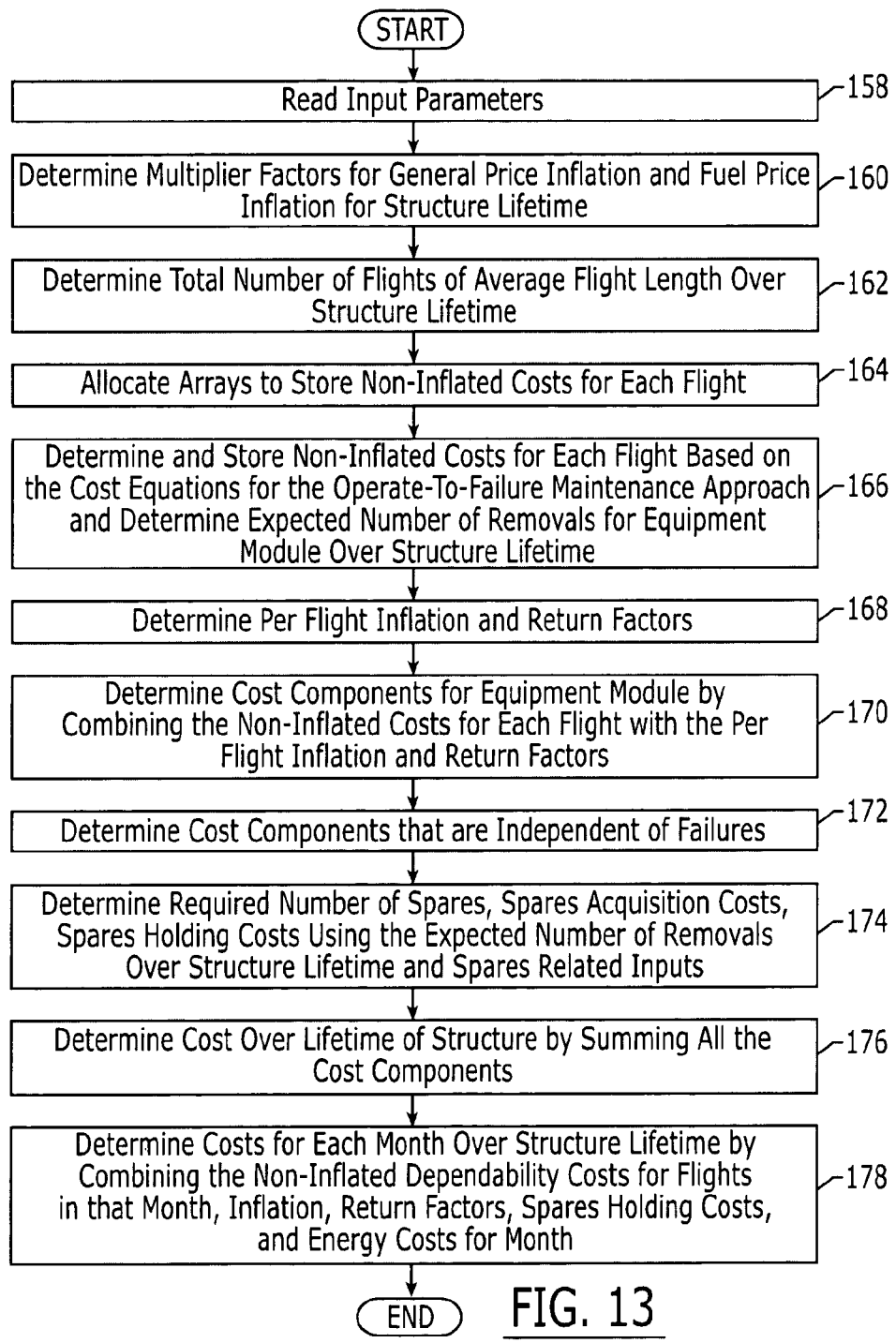
Figure 14:
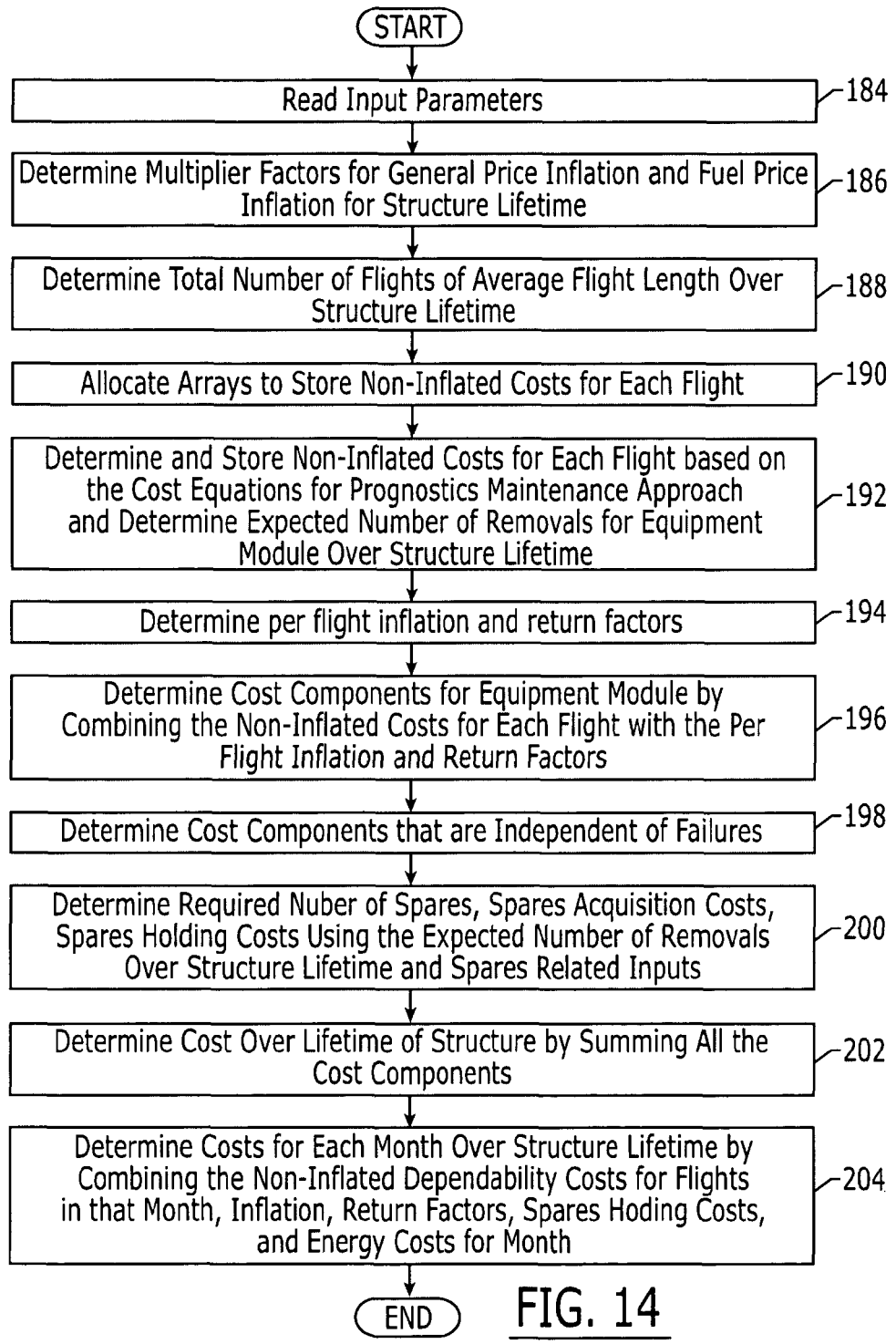
Figure 15A:
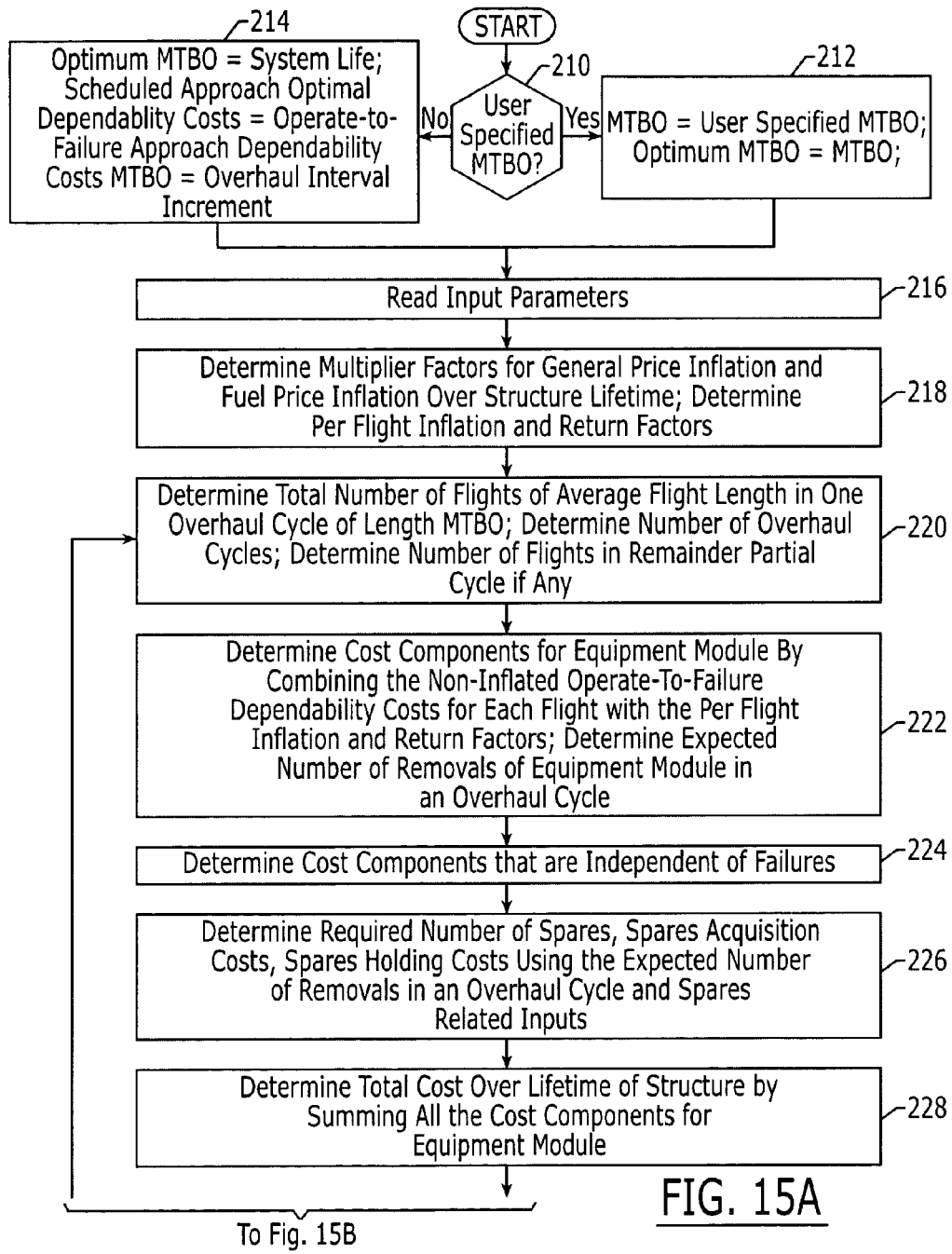
Figure 15B:
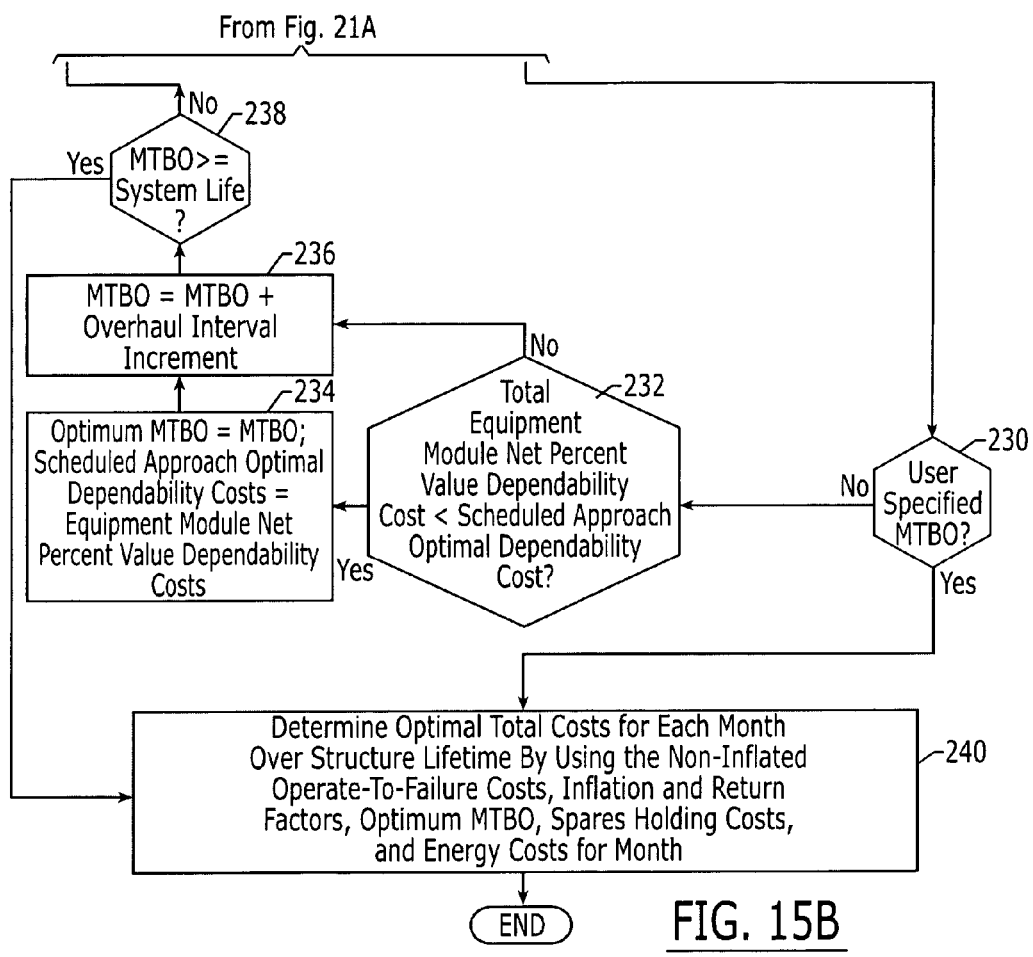
Figure 17:
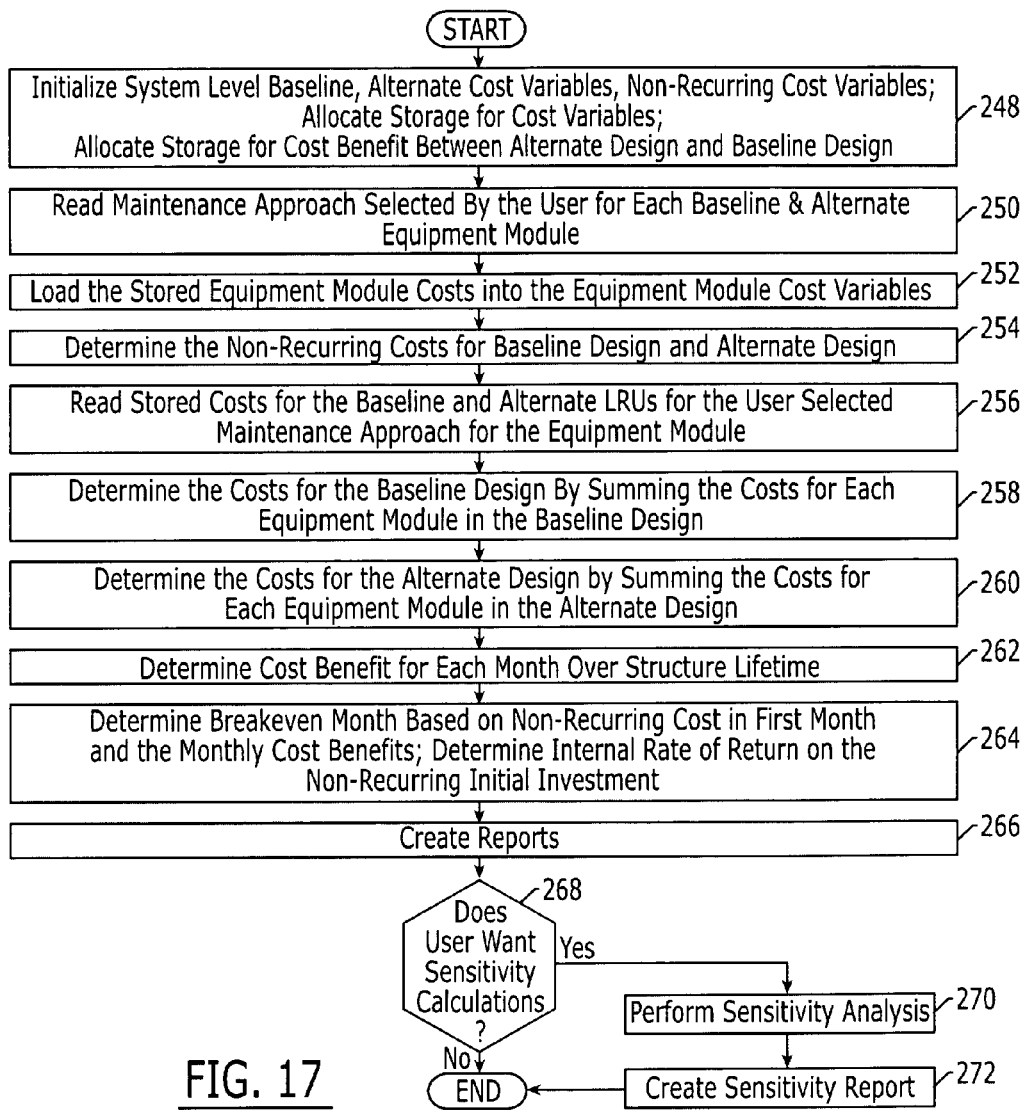
Figure 18A:
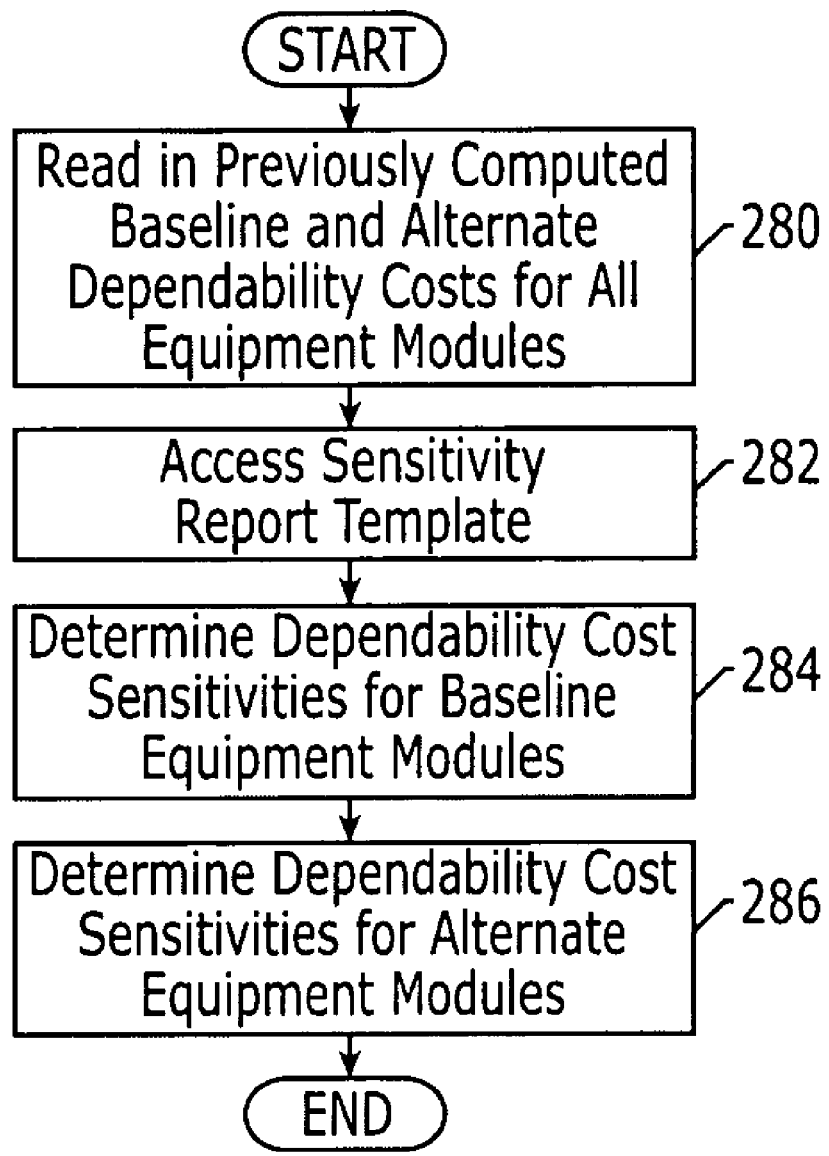
Figure 18B:
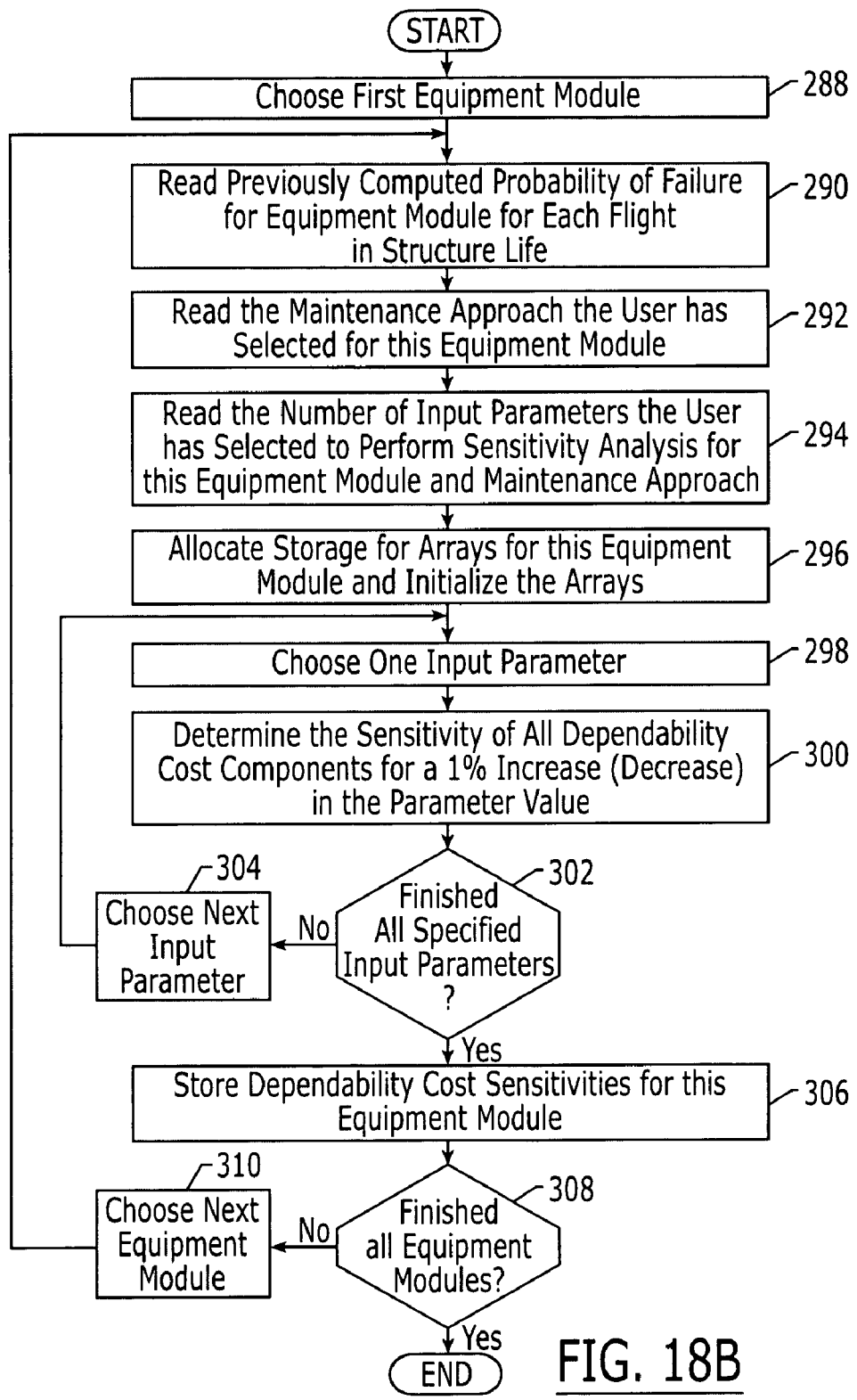
Figure 22:
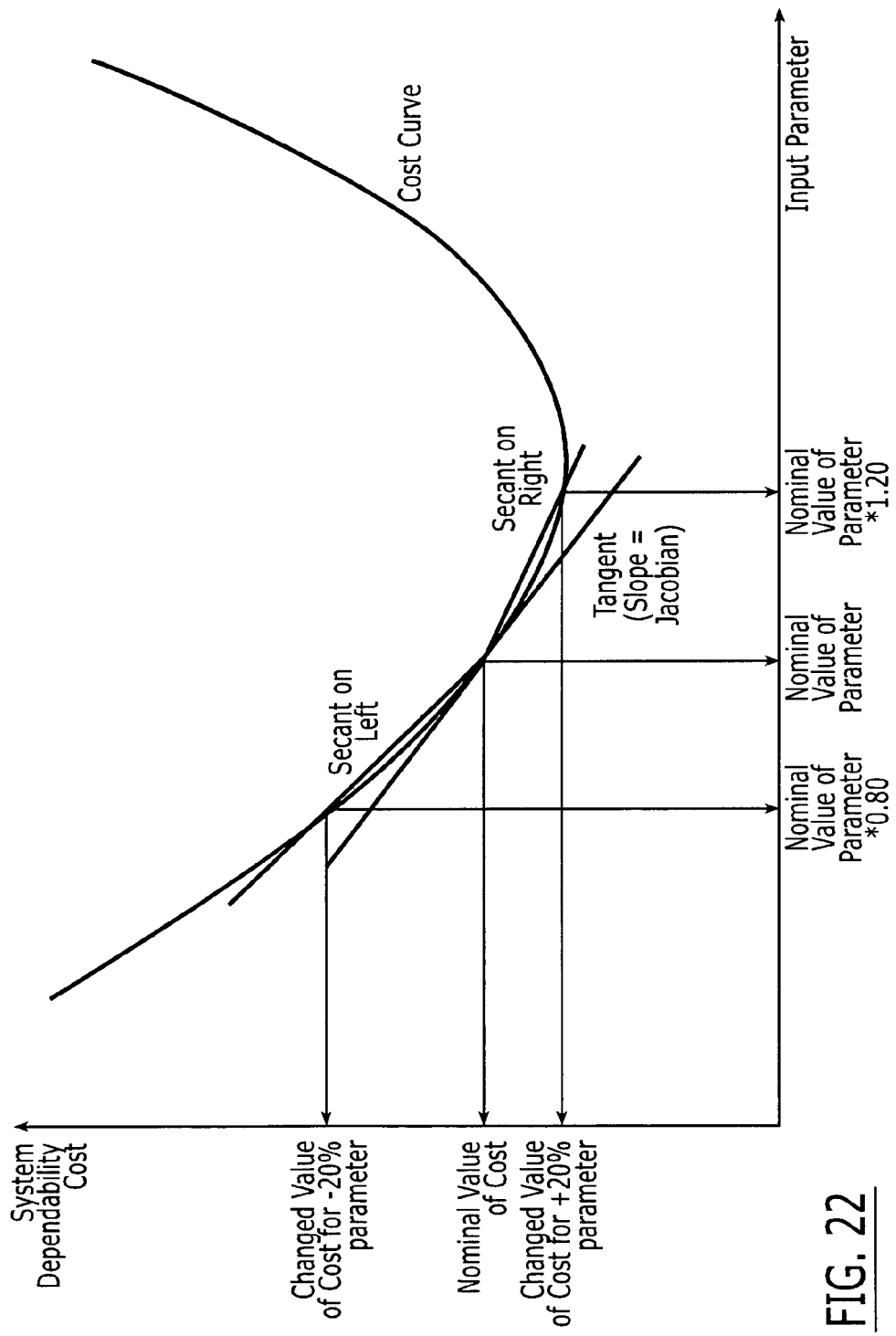

FIGS. 9A, 9B, and 9C illustrate the equipment module input parameters according to one embodiment of the present invention;

FIG. 10 is a flow chart illustrating the overall equipment module cost evaluation according to one embodiment of the present invention;

FIG. 11 is a flow chart illustrating an individual equipment module cost evaluation according to one embodiment of the present invention;

FIG. 12 is a flow chart illustrating a failure probability determination for a respective equipment module according to one embodiment of the present invention;

FIG. 13 is a flow chart illustrating a cost evaluation for an equipment module based upon an operate-to-failure maintenance approach according to one embodiment of the present invention;

FIG. 14 is a flow chart illustrating a cost evaluation for an equipment module based upon a prognostics maintenance approach according to one embodiment of the present invention;

FIGS. 15A and 15B are a flow chart illustrating a cost evaluation for an equipment module based upon a scheduled maintenance approach according to one embodiment of the present invention;

FIGS. 16A and 16B illustrate the baseline cost evaluations for two baseline equipment modules and the alternate cost evaluations for two alternate equipment modules according to one embodiment of the present invention;

FIG. 17 is a flow chart illustrating the structure level cost evaluation according to one embodiment of the present invention;

FIGS. 18A and 18B are flow charts illustrating the sensitivity analysis according to one embodiment of the present invention;

FIGS. 19A and 19B illustrate the acquisition and sustaining costs associated with each of the selected maintenance approaches for each of the baseline and alternate equipment modules and the total acquisition and sustaining costs for each of the baseline and alternate structures according to one embodiment of the present invention;

FIG. 20 illustrates a report of a sensitivity analysis performed for input parameters associated with baseline equipment modules according to one embodiment of the present invention;

FIG. 21 illustrates a report of a cost benefit analysis for a baseline and an alternate design according to one embodiment of the present invention; and FIG. 22 illustrates a cost curve utilized in performing sensitivity analysis according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
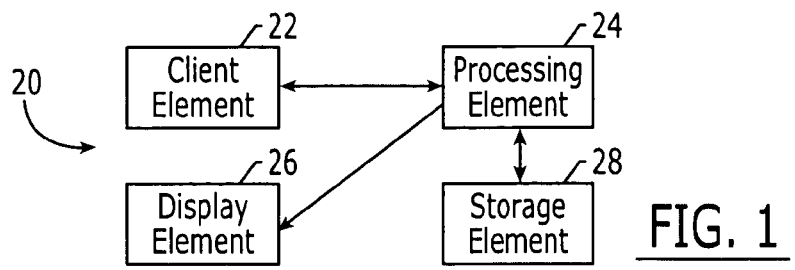
FIG. 1 illustrates a system that includes a client element, processing element, display element and storage element, according to one embodiment of the present invention.

The method and system for evaluating costs of various maintenance approaches of the present invention may be implemented on any type of system that includes at least one client element, at least one processing element, at least one display element and at least one storage element, such that information may be received by the client element, determinations may be made by the processing element based at least in part upon the received information, and the results may be presented on the display element. FIG. 1 illustrates one embodiment of the system 20 of the present invention in which input parameters are received by the client element 22 and transmitted from the client element to the processing element 24. The processing element 24 then determines costs based upon the input parameters, as explained in detail below, and transmits the costs to the display element 26 where the costs are presented for viewing. The costs and parameters also may be transmitted to a storage element 28. The embodiment of FIG. 1 illustrates the costs and parameters transmitted from the processing element 24 to the storage element 28. Alternatively, the parameters may be transmitted to the storage element 28 directly from the client element 22. Furthermore, the parameters and costs may be transmitted among the client element 22, processing element 24, display element 26 and/or storage element 28 in other manner known to those skilled in the art.

The processing element(s) 24 of one embodiment may be embodied by a server. For example, the server may be a web server and an application server that may be located on the same physical device or the web server may be separate from and in communication with the application server via the Internet, intranet or any other computer network. The client element(s) 22, processing element(s) 24, display element 26 and, in one embodiment, the storage element(s) 28 may be part of a single workstation, computer, server or other computing device and, as such, may communicate with each other via internal transmissions. For example, in one advantageous embodiment, the method and system 20 of the present invention may be implemented on a personal computer running Microsoft Excel application software, having a monitor and a sufficient amount of memory, such that the personal computer embodies the client element 22, processing element 24, display element 26 and storage element 28. In an alternative embodiment, however, one or more of the client element(s) 22, processing element(s) 24, display element 26 and, in one embodiment, the storage element(s) 28 may be distributed as parts of different workstations, computers, servers or computing devices that may be in different physical locations and in communication with each other via the Internet, intranet or other computer network(s) 26. To be consistent, the discussion hereinafter refers to the different elements of the system 20 as being part of a single device, unless otherwise stated.

The storage element 28 may be a database or any other type of storage device known to those skilled in the art. The storage element 28 may be part of one or more of the client element(s) 22 and/or one or more of the processing element(s) 24, or may be separate from the client element(s) 22, and the processing element(s) 24 and in communication with one or all of the elements via the Internet, intranet or other computer network(s) 30. Regardless of the configuration, if the storage element 28 is a database, it may be accessed by other elements of the system 20 via an interface, such as, but not limited to, a Common Object Request Broker Architecture (CORBA), active data object (ADO) interface or open database connectivity (ODBC) interface.

The client element(s) 22 represent the device or devices that users of the system 20 may utilize to perform their duties regarding the input parameters, to request an evaluation of the costs associated with various maintenance approaches based upon the input parameters, and/or to select particular maintenance approaches for respective equipment modules, as will be explained in detail below. The client element(s) 22 may be a laptop computer, a personal computer or workstation, networked personal computers or workstations, or any other type of computing device or configuration operating on any type of computer platform and capable of communications with the processing element(s) 24. Thus, in some embodiments, the display element 26 is part of the client element 22. For example, the client element(s) 22 may support a browser interface to permit communications with the processing element(s). The browser interface is generally an Internet browser, but other browser interfaces capable of receiving and/or appropriately displaying the parameters and cost evaluation data, soliciting user input, and, in a distributed environment, communicating with a computer network may be utilized if desired. The system 20 may include many client elements 22 such that many users may utilize the system 20. The client element(s) 22 may physically be located anywhere as long as the client element(s) 22 are in communication with the processing element(s) 24 either via internal communications or via the Internet, intranet or other computer network in distributed environments.

As described above, the processing element(s) 24 of one advantageous embodiment may include a web and application server, which may utilize any modern operating system, such as, but not limited to, Microsoft Windows, UNIX, or Linux, and any modern web development platform, such as, but not limited to, JAVA, commercially available from Sun Microsystems, Inc. One or more application program(s) may reside on the web and application server(s). Among other functions, the processing element(s) 24 provide the information/instructions required to perform a task and/or provide the requested information regarding particular cost evaluations to the client element(s) 22 in any appropriate form, such as, but not limited to, a web page form having predefined fields. The form may be viewed by a user as "screens" via display element 26 and the browser interface. As known to those skilled in the art, the screens may be interactive and prompt the user for the action or information necessary for the system 20 to request parameters, provide cost evaluations and allow selection of certain maintenance approaches for each equipment module of an overall structure, as explained in detail below. After the user submits responses to the prompts provided by a screen and/or selects certain options presented on the screen, the processing element(s) 24 can determine the content and prompts to be provided by successive screens. The processing element(s) 24 may access/query the storage element 28 to provide the content for any of the screens, based upon the actions taken by the user and/or the request of the user. For example, if a user, such as a structure designer, requests certain cost evaluations associated with one or more maintenance approach for one or more equipment module of the structure based upon certain input parameters, the processing element(s) 24 receive the request from the user via a client element 22, determine the requested information, populate and format a screen containing the requested information, and submit the screen to the display element 26 for viewing by the user. Furthermore, if the particular user is to perform a task regarding the presented cost evaluations, such as selecting a desired maintenance approach for each respective equipment module of the structure, the processing element(s) 24 provide a screen to the user containing the information associated with the task and prompt the user to perform the task. The information requested and received may then be stored in the processing element(s) 24 or in the separate storage element 28, such that future requests for the same information may be obtained quickly from the processing element(s) 24 and/or the storage element 28, instead of having to request or compute the information again.

Figure 2:
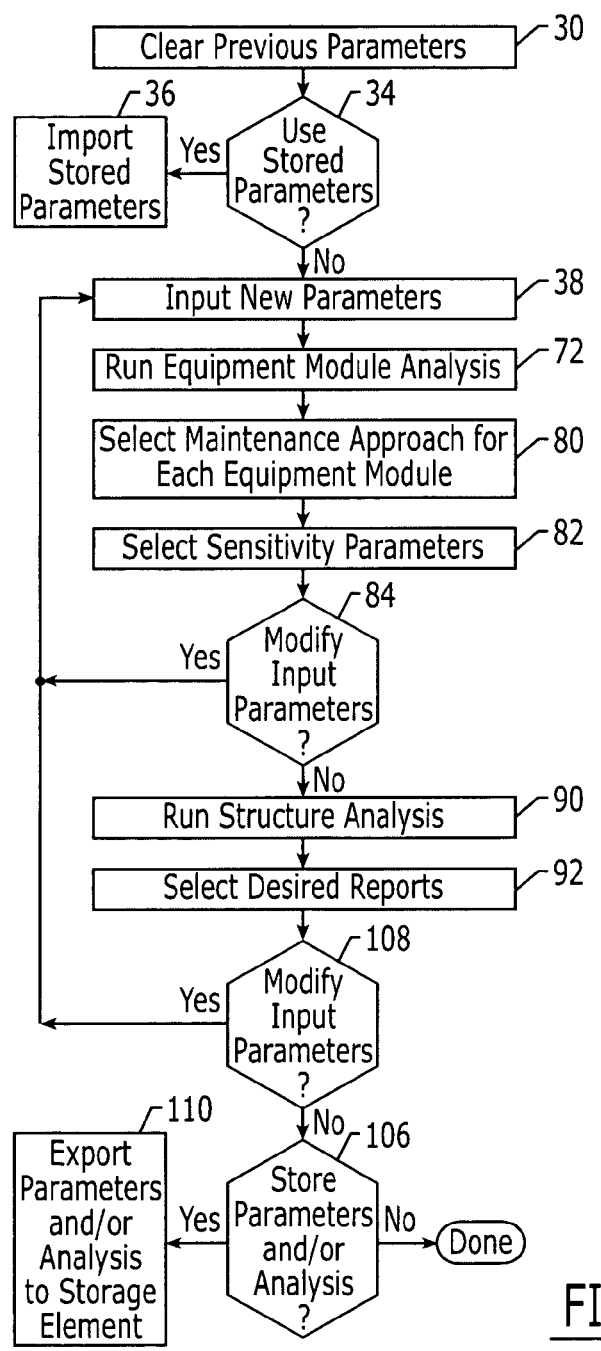
FIG. 2 is a flow chart illustrating a method and system for evaluating costs associated with various maintenance approaches for at least one equipment module of a structure according to one embodiment of the present invention.
Figure 3:
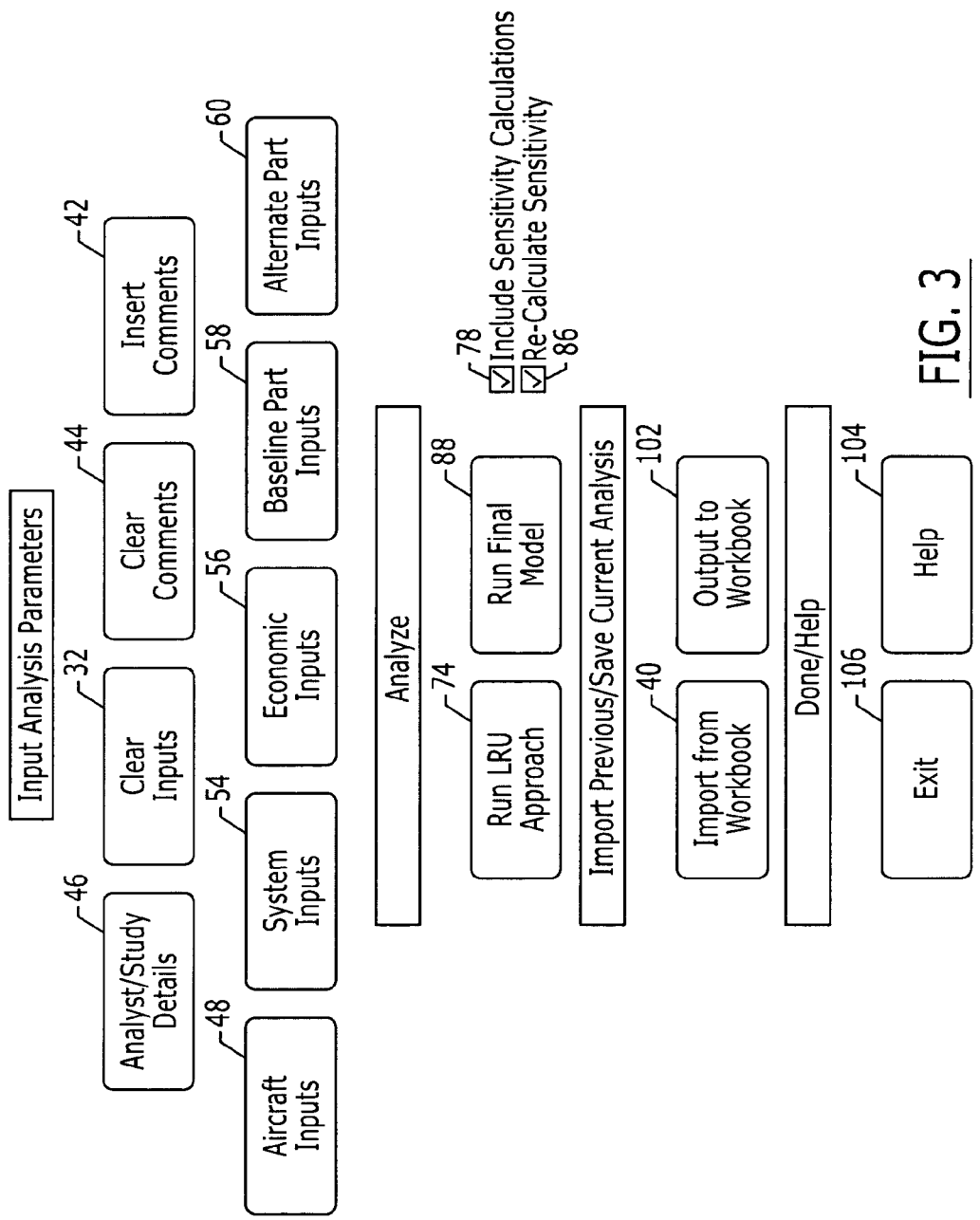
FIG. 3 illustrates a screen that may be presented to a user to facilitate the receipt of information from and/or the selection of options by the user according to one embodiment of the present invention.

One embodiment of the method and system 20 for evaluating costs associated with various maintenance approaches for at least one equipment module of a structure is illustrated by the flowchart of FIG. 2. One embodiment of a screen that is correlated with the flowchart of FIG. 2 and that may be presented to a user, such as via the display element 26 to facilitate the receipt information from and/or the selection of options by the user, such as via the client element 22, is shown in FIG. 3. The maintenance approaches analyzed in this embodiment include an operate-to-failure maintenance approach, a scheduled maintenance approach and a prognostics maintenance approach, which are described in detail in the background section of this document, but any other type of maintenance approach may also be analyzed. An equipment module may be an individual component, a component within a system, or a system of components, and the structure may be any type of structure that is made of one or more equipment module. For purposes of explanation, the structure may be an aircraft and the equipment modules may be any of the components of the aircraft.

As shown in the embodiment of FIG. 2, if a previous analysis has been completed by the method and system 20, then the parameter inputs associated with the previous analysis are cleared (block 30). As such, the embodiment of FIG. 3 illustrates a "Clear Inputs" option 32 that may be presented to the user. If the user selects the "Clear Inputs" option with any type of selection device, such as a mouse or a keyboard associated with the client element 22, then the previous parameters are cleared. Alternatively, the parameter inputs may be automatically cleared once an analysis has been completed or once a user has logged out of the system 20. If the previously entered input parameters are cleared, then the user may input new parameters. The user has the option (block 34) of using stored input parameters (block 36) or manually entering new input parameters (block 38). To utilize stored input parameters, the input parameters may be imported to the client element 22 and/or the processing element 24 from the storage element 28 in one embodiment. In other embodiments, the input parameters may be stored in the client element 22 and imported to the processing element 24 or the input parameters may be stored in the processing element 24. FIG. 3 illustrates that a user may import previously stored input parameters and/or previously stored analyses by selecting the "Import from Workbook" option 40.

In further embodiments of the method and system 20, users also may enter comments associated with respective parameters and/or with the resulting analyses of the equipment modules and/or structure, as described below, such as by selecting the "Insert comments" option 42 of FIG. 3. The user also has the option of clearing the comments before entering new parameters or performing a new analysis, particularly if comments have been previously entered for parameters that have been cleared as described above. A user may clear the comments such as by selecting the "Clear Comments" option 44 of FIG. 3. In other embodiments, one or more of the comments may be automatically cleared when the respective parameter to which the comment is associated is cleared. In embodiments in which the previous parameters are automatically cleared once an analysis has been completed or once a user has logged out of the system 20, then the comments associated with the previous parameters also may be automatically cleared. The user also may have the option of entering a name or any other type of identifier for the analysis at any time before, during or after the analysis, such as by selecting the "Analyst/Study Details" option 46 of FIG. 3. The identifier is then associated with the input parameters and the results of the analysis, which may be stored, such as in the storage element 28, for future reference.

The input parameters include parameters regarding at least the equipment module(s), the structure, and economic factors. For example, in one embodiment in which the structure is an aircraft, the input parameters include information regarding the aircraft, the equipment module(s) of the aircraft to be analyzed, and economic inputs related to the aircraft and/or the equipment module(s). The input parameters regarding the structure, which is an aircraft in this example, may include any type of information about the structure that pertains to the costs analyses of the equipment module(s) based upon any one or more of the maintenance approaches. In the embodiment shown in FIG. 3, a user may enter the input parameters for the aircraft by selecting the "Aircraft Inputs" option 48.

FIG. 4 illustrates one embodiment of a chart of the default input parameters for a structure, when the structure is an aircraft, i.e., the aircraft level inputs. In this example, the input parameters, which may include both original equipment manufacturer (OEM) default parameters 50 and user-defined parameters 52, are associated with one or more type of aircraft. In addition, a user may select from the default parameters 50 associated with a particular aircraft model or the user may enter and select from desired user-defined parameters 52. If the user selects from the user-defined default parameters associated with a particular aircraft model, the user may modify any of the default parameters as desired. In the embodiment of the aircraft level input parameters shown in FIG. 4, the default input parameters are associated with aircraft models A, B, C and D. Thus, the models may represent any type of aircraft in which it is desired to test the equipment module. In the aircraft structure example, the input parameters may include the aircraft fleet size, the average number of flights per year per aircraft, the average flight hours per flight, the average delay cost per delay hour, the average cancellation cost per cancellation, the average air turnback cost per turnback, the average diversion cost per diversion, the out of service cost per day, and the pounds of fuel burned per flight hour per pound additional weight. The default parameter entries for each type of aircraft are located in the column under the respective aircraft type heading. Thus, if a user selects the default aircraft level input parameters for a model B aircraft, the entries in the column below the model B heading are the aircraft level input parameters that will be used by the system unless the user modifies any of the entries.

In one embodiment of the method and system 20 of the present invention, once the user selects a particular set of OEM default parameters 50 or user-defined default parameters 52, then the user may enter the selected parameters as the baseline parameters and alternate parameters, such that the same parameters are utilized by the system 20 in evaluating the cost of the baseline equipment module(s) and structure and in evaluating the cost of the alternate equipment modules(s) and structure, if any. An example of a selection of the model B aircraft default input parameters for both a baseline evaluation and any alternate evaluation is shown in FIG. 5. In other embodiments of the method and system 20 of the present invention, the user may select different sets of default parameters for each of a baseline calculation and an alternate calculation, or manually enter different user-defined input parameters for each of a baseline calculation and an alternate calculation.

A user also enters the initial structure costs, such as the acquisition costs, and general information, such as lifetime information, for the equipment module(s) to be evaluated, i.e. system, such as by selecting the "System Inputs" option 54 of FIG. 3. FIG. 6 illustrates one embodiment of the input parameters regarding the acquisition costs and lifetime information, i.e., the system level inputs. For example, as shown in FIG. 6, the user may specify a name for the system, the year the system is delivered, the acquisition cost of the system, the increase in the acquisition cost of the system due to prognostics for the system, the support equipment cost for the system, the initial training cost for the system, and the length of the life of the system. In other embodiments, any other type of input parameter regarding acquisition costs or other general information regarding the equipment module(s) may also be entered. As shown in FIG. 6, the user may enter the same or different input parameters for a baseline analysis and an alternate analysis. Although discussion regarding the embodiment of FIG. 6 describes a user entering each of the system level inputs, other embodiments may permit the user to select default parameters or modified default parameters for the system level inputs, as described with the aircraft level inputs, or stored system level input parameters may be imported as described above.

Economic input parameters also may be entered by the user, such as by selecting the "Economic Inputs" option 56 of FIG. 3. FIG. 7 illustrates one embodiment of the economic input parameters associated with the equipment module(s), the structure or any other aspect of the analysis. For example, as shown in FIG. 7, the economic input parameters for the aircraft structure example include the average fuel and non-fuel inflation rates for years beyond the present year, the insurance factor, the minimum attractive rate of return, the spares holding factor (a percentage of the spares costs), the maintenance labor burden factor (the ratio of the burdened labor rate to the unburdened labor rate less one), the direct labor rate per hour, and the fuel cost per gallon. As illustrated in FIG. 7, the user may select the OEM default economic input parameters or enter and select user-defined default economic input parameters specific to the user's operations, which are represented as user default 1 and user default 2 in FIG. 7. In the case of FIG. 7, only the OEM defaults have been populated. A user may select any set of default economic input parameters, such as the OEM, user default 1 or user default 2 input parameters, for the baseline and/or alternate analyses. For instance, as shown in the embodiment of FIG. 8, the user selected the OEM default economic input parameters to utilize for both the baseline and the alternate analyses. In other embodiments, the user may select different economic input parameters for the baseline and alternate, if any, analyses.

The user also enters parameters regarding the baseline equipment module(s) and the alternate equipment module(s), if any, such as by selecting the "Baseline Part Inputs" option 58 and the "Alternate Part Inputs" option 60, respectively. Parameters associated with any number of baseline and/or alternate equipment modules may be entered in the system 20. In one embodiment, up to 35 baseline equipment modules and up to 35 alternate equipment modules may be entered in the system 20. Specifying alternate equipment modules permits a user to define an alternate system of equipment modules and compare the alternate system to the baseline system of equipment modules. FIGS. 9A, 9B and 9C illustrate one embodiment of the equipment module input parameters. In the embodiment of FIGS. 9A, 9B and 9C, for example, the input parameters for two baseline equipment modules may be entered in columns 68 and the input parameters for two alternate equipment modules may be entered in columns 70.

Some equipment module input parameters are required only if the respective equipment module is analyzed with respect to certain maintenance approaches. In the embodiment of FIGS. 9A, 9B and 9C, some of the input parameters are unique to certain maintenance approaches. For example, the input parameters in portion 62 are unique to a scheduled maintenance approach and the input parameters in portion 64 are unique to a prognostic maintenance approach. Thus, if a user selects not to analyze an equipment module under either the scheduled maintenance approach or the prognostic maintenance approach, such as by entering "NO" in the appropriate segment for the appropriate equipment module as indicated by options 66 of FIG. 9A, then the unique parameters 62, 64 for the respective maintenance approach(es) are not necessary.

The equipment module input parameters of the embodiment shown in FIGS. 9A, 9B and 9C include basic equipment module information, maintenance event information, maintenance labor/materials information, schedule interruptions information, spares information, and fuel burn information. In other embodiments, such as embodiments that evaluate equipment modules for structures other than aircraft or that evaluate the equipment modules based upon other maintenance approaches, the equipment module input parameters may include various other types of information regarding the equipment module(s). The basic equipment module information includes an equipment module number, a description of the equipment module, and the number of the equipment modules per aircraft.

The maintenance event information includes the unscheduled removal no fault found (NFF) rate, the mean time between failure in flight hours, the equipment module part failure time distribution, which in the embodiment of FIGS. 9A, 9B and 9C may be exponential, Weibull or normal, as known to those skilled in the art. The maintenance event information also includes the Weibull shape factor or normal standard deviation if either is chosen as the part failure time distribution. If an equipment module is evaluated based upon a scheduled maintenance approach, then the maintenance event information also includes the mean time between overhauls for the respective equipment module. This input represents the average time in flight hours between any two consecutive scheduled removals of a respective equipment module for a shop level refurbishment/overhaul of the equipment module. A user may input a value for the mean time between overhaul for one or more of the equipment modules or the user may leave the entry blank. If the user leaves the mean time between overhaul entry blank for a respective equipment module, then an optimized mean time between overhaul value is determined for the respective equipment module, which is the mean time between overhaul value that yields the lowest operating costs over the lifetime of the structure for a scheduled maintenance approach, in one embodiment of the method and system 20. If an equipment module is evaluated based upon a prognostics approach, then the maintenance event information also includes the percentage of correct prognostic failure predictions and the percentage of false alarms for the respective prognostic equipment module.

The maintenance labor/materials information includes the line labor hours per removal, the line labor hours per non-removal maintenance action, the shop labor hours per failure to repair and test the equipment module, the shop labor hours per unconfirmed failure, i.e., the test time, and the average shop material cost per failure. If an equipment module is evaluated based upon a scheduled maintenance approach, then the maintenance labor/materials information also includes the shop maintenance hours per overhaul and the average material per overhaul for the respective equipment module. If an equipment module is evaluated based upon a prognostics approach, then the maintenance labor/materials information also includes the shop labor hours per justified prognostic removal, the average shop material cost per justified prognostic removal, and the additional prognostics cost per 1000 flight hours for the respective prognostic equipment module.

The schedule interruptions information includes the "out of service days" per failure, the delay rate per unscheduled removal, the cancellation rate per failure, the air turnback rate per failure, the diversion rate per failure, and the average delay time in hours.

The spares information includes the cost per spare unit, whether the equipment module is expendable, whether spares are required for the respective equipment module, the number of days for shop turn around time, and the main base fill rate. If an equipment module is evaluated based upon a prognostics approach, then the spares information also includes cost per prognostic spare unit and the prognostic quantity per aircraft for the respective prognostic equipment module.

The fuel burn information includes the equipment module weight, fuel burn due to horsepower, and pounds of fuel per block trip. If an equipment module is evaluated based upon a prognostics approach, then the fuel burn information also includes the prognostic equipment module weight, the fuel burn due to horsepower when the prognostic equipment module is utilized, and the pounds of fuel burn per block trip when the prognostic equipment module is utilized.

The input parameters described above are examples of input parameters when an aircraft is the structure in which the equipment module(s) are located, when the equipment modules and structure are evaluated based upon at least one of an operate-to-failure maintenance approach, a scheduled maintenance approach, and a prognostics maintenance approach, and when the economic input parameters and cost determinations are based, at least in part, upon a dependability cost theory. Other input parameters regarding other types of structures, equipment modules, maintenance approaches, and economic theories, as known to those skilled in the art, may be utilized in other embodiments of the method and system 20 of the present invention. While not all of the input parameters are necessary for each analysis, the more input parameters that are included, the more accurate the analysis, generally. In addition, not all of the input parameters are applicable for each analysis. For example, the increase in system acquisition cost due to prognostics input parameter would only be applicable if the user selects a prognostic maintenance approach for one or more of the equipment modules in the baseline or alternate system. In this example, once the user has selected the desired maintenance approach for each equipment module, then the user can enter the increase in system acquisition cost due to prognostics input parameter, if the user has selected a prognostic maintenance approach for one or more of the equipment module(s), for use in the structure analysis, as described further below.

As shown in FIG. 2, once the input parameters are entered, then the user may run the equipment module analysis (block 72). As stated above, the cost determinations made by the embodiment of the method and system 20 described with respect to the input parameter examples above are built upon a dependability cost theory. In this embodiment, when an aircraft is the structure, the dependability cost is the quantitative assessment of an aircraft's ability to meet schedules, require low cost maintenance, and be easily and quickly restored when a failure occurs. The elements of dependability cost therefore include line maintenance, shop maintenance, schedule interruptions, spares, and scheduled maintenance. These elements were the guidelines for the equipment module input parameters described above. In other embodiments, any other type of cost theory may be used as the basis for the cost determination, such that at least a portion of the input parameters would be based on the desired cost theory. The evaluation of the cost of each of the maintenance approaches for each of the equipment modules and the structure then may be quantified in terms of the cost theory. For example, in the embodiment described herein, the dependability cost theory is used to evaluate the cost of each of the maintenance approaches for each of the equipment modules and the structure, such that the costs may be quantified in terms of the dependability cost.

In addition, in the embodiment of the method and system 20 described herein, the costs that are determined for each of the equipment modules and/or the structure may be determined over the lifetime of the structure, which may be entered as an input parameter regarding the structure, as described above. In other embodiments of the method and system 20 of the present invention, the costs for one or more of the equipment modules and/or the structure may be determined over any other desired time period, such as over a month time period. The costs also may be determined by calculating the net present value life cycle costs for one or more of the costs associated with the equipment module(s) and/or the structure, where net present value is the present value of an investment's future net cash flow minus the initial cost of the investment. In other embodiments of the method and system 20 of the present invention, the costs may be determined by calculating any other type of cost representation, as known to those skilled in the art.

To run the equipment module analysis, the user may select the "Run LRU Approach" option 74 in the screen of FIG. 3, where an LRU (Line Replaceable Unit) is commonly equivalent to an equipment module as defined herein in conjunction with the aircraft example. The equipment module analysis determines the costs associated with each of the equipment modules for each maintenance approach that the user desires. For example, in one embodiment of the method and system of the present invention, the equipment module analysis determines both the acquisition and sustaining costs associated with each of the equipment modules for one or more of the operate-to-failure maintenance approach, the scheduled maintenance approach and the prognostics maintenance approach. As described above regarding the equipment module input parameters, the user can select which maintenance approaches to evaluate for each equipment module, by entering "NO" in the appropriate segment for the appropriate equipment module as indicated by options 66 of FIG. 9A. In other embodiments, the user may indicate which maintenance approaches are to be evaluated for which equipment modules in any other manner known to those skilled in the art, such as by the selection with a selection device of the desired maintenance approaches or any other type of maintenance approach indication associated with the appropriate equipment module(s).

FIG. 10 is a flow chart illustrating an overview of one embodiment of an equipment module analysis. The process begins by initializing the baseline equipment module variables, the alternate equipment module variables, the dependability cost variables, arrays and intermediate variables (block 120), such as by entering an initial value for the variables. Thus, the variables may be initialized to zero or to predefined default values. Any output data and/or intermediate data sheets, which are temporary storage areas for storing values in intermediate variables, from a previous equipment module analysis is cleared in preparation to perform the present equipment module analysis (block 122). The input parameters are then read and checked to ensure they are valid (block 124). If any of the input parameters are found to be invalid, such as when a negative value is entered for any of the input parameters shown in FIG. 4, processing of the input parameters is halted and an error message may be displayed on the display element to inform the user of the error. Once the user corrects the invalid parameter, the processing of the input parameters may resume. If the input parameters are valid, then the costs for each baseline and alternate, if any, equipment module may be determined (blocks 126 and 128), as described in detail below. In some embodiments of the method and system 20 of the present invention, the monthly net present value dependability cost and the total net present value dependability cost, such as over the lifetime of the structure, are determined for each equipment module. The total costs for each equipment module are stored (block 130), such as in intermediate data sheets in the storage element 28, for later use, such as for use in the structure analysis described below. The total costs for each baseline and alternate, if any, equipment module then may be displayed (block 132), such as by display element 26.

FIG. 11 is a flow chart of one embodiment for determining the costs for each equipment module. The process begins by selecting one equipment module and its associated input parameters to analyze (block 134). In the embodiment of the method and system 20 illustrated in FIG. 11, the equipment module analysis begins by determining the probability of failure for each performance of the respective equipment module, such as for each flight of an aircraft, over the life of the structure (i.e. aircraft) as dictated by the failure time distribution selected for the respective equipment module. As described regarding the equipment module input parameters, the failure time distribution may be exponential, normal or Weibull. For example, the method and system 20 may determine whether there has been any change in the respective equipment module input parameters that would influence a failure probability computation since a previous analysis regarding the respective equipment module (block 136). If a previous failure probability analysis has been run on the respective equipment module and no input parameters have changed, then the previously determined failure probability for the respective equipment module is read (block 138), such as from the storage element 28. If a previous probability analysis has not been run on the respective equipment module or if one or more input parameters have changed since a previous probability analysis, then the probability of failure for the respective equipment module for each flight over the life of the structure may be determined (block 140). The failure probability for the respective equipment module may be stored (block 142), such as in storage element 28.

FIG. 12 is a flow chart of one embodiment for determining a failure probability for a respective equipment module. The number of flights of an average flight length over the life of the structure is determined (block 144). Storage for a failure probability array for the respective equipment module may be allocated (block 146), such as in storage element 28. The method and system 20 then may determine whether failure time distribution for the respective equipment module is exponential (block 148). If so, then as shown in block 150, the probability of failure failprob in each flight for the respective equipment module may be defined as follows:

$$failprob(\text{flight}) = 1.0 - e^{-\frac{FlightHoursperFlight}{OTFMTBF}}; \text{flight} = 1, \ldots, lifeligths$$

wherein lifeflights is defined as:

lifeflights=SystemLife*NumFlightsperYearperPlane

If the failure distribution for the respective equipment module is not exponential, then the method and system 20 may determine the probability of a first failure in each flight for the respective equipment module (block 152) and then use discrete renewal equations to compute the probability of failure in a flight in light of earlier flight failures, as known to those skilled in the art (block 154). For example of the failure time distribution, is Normal, the probability of a first failure firstfailprob (block 152) may be determined as:

firstfailprob(flight)=CDFNormal
(flight*FlightHoursperFlight,OTFMTBF,OTF-
Beta)−CDFNormal((flight−1)*FlightHoursper-
Flight,OTFMTBF,OTFBeta)

wherein CDFNormal represents a normal cumulative distribution function. Also the probability of failure in a flight considering earlier flight failures failprob (block 154) may be determined as:

$$failprob(\text{flight}) = \\ firstfailprob(\text{flight}) + \sum_{i=1}^{flight-1} firstfailprob(i) * failprob(\text{flight}-i);$$

$$\text{flight} = 1, \ldots lifelights$$

Similarly, if the failure time distribution is Weibull then the probability of a first failure firstfailprob may be determined as:

firstfailprob(flight)=CDFWeibull
(flight*FlightHoursperFlight,OTFMTBF,OTF-
Beta)−CDFWeibull((flight−1)*FlightHoursper-
Flight,OTFMTBF,OTFBeta)

and also the probability of failure in a flight considering earlier flight failures failprob may be determined as:

$$failprob(\text{flight}) = \\ firstfailprob(\text{flight}) + \sum_{i=1}^{\text{flight}-1} firstfailprob(i) * failprob(\text{flight}-i);$$

$$\text{flight} = 1, \ldots \text{lifeflights}$$

Based upon the failure probabilities determined for each equipment module and the structure, system, economic, and equipment module input parameters, the dependability cost components over the lifetime of the structure for the operate-to-failure maintenance approach, the scheduled maintenance approach and/or the prognostic maintenance approach may then be determined, according to one embodiment of the present invention. The example described below determines the costs associated with the operate-to-failure maintenance approach first, then the prognostic maintenance approach, and finally the scheduled maintenance approach, if one or more of the respective maintenance approaches are selected. In other embodiments, however, the costs associated with one or more of the various maintenance approaches may be determined in any order.

In the example of FIG. 11, once the failure probability for the respective equipment module is obtained or determined, then the costs associated with the operate-to-failure maintenance approach for the respective equipment module may be determined (block 156). The flowchart of FIG. 13 illustrates one embodiment for determining the costs associated with the operate-to-failure maintenance approach for a respective equipment module. This embodiment begins by reading the structure, system, economic and respective equipment module input parameters into local holding variables (block 158). The net present value multiplier factors for general price inflation and fuel price inflation are determined over the lifetime of the structure (block 160) using net present value equations. One exemplary set of equations for determining the net present value multiplier factors for general price inflation GenNPVFactor and fuel price inflation FuelNPVFactor are set forth below:

$$GenNPVFactor = \begin{cases} \dfrac{gr - gr^{SystemLife+1}}{1-gr}; & gi \neq marr \\ SystemLife; & gi = marr \end{cases}$$

$$FuelNPVFactor = \begin{cases} \dfrac{fr - fr^{SystemLife+1}}{1-fr}; & fi \neq marr \\ SystemLife; & fi = marr \end{cases}$$

wherein $gr$ is defined as $gr = \dfrac{1+gi}{1+marr}$, $gi$ is defined as $$gi = \dfrac{NonFuelInflationRate}{100},$$

$marr$ is defined as $marr = \dfrac{MinRateOfReturn}{100}$, $fr$ is defined as $fr = \dfrac{1+fi}{1+marr}$, and $fi$ is defined as $fi = \dfrac{FuelInflationRate}{100}$.

The total number of flights of average flight length over the lifetime of the structure, when the structure is an aircraft, is determined (block 162). Arrays in which to store, such as in storage element 28, non-inflated costs for each flight are allocated (block 164). The non-inflated costs for each flight are determined based upon the cost equations for the operate-to-failure maintenance approach using the failure probability for the respective equipment module in each flight and the equipment module and other input parameters (block 166). In one embodiment, the cost equations include multiplying the probability of failure in a specific flight by the cost of a single failure event, for each of the respective cost categories. Exemplary non-inflated costs utilizing the operate to failure maintenance approach can be determined for flight 1, ..., lifeflights with the maintenance costs including: (1) the line labor cost which may be defined as:

$$otflinelaborcost(\text{flight}) = \\ (failprob(\text{flight}) + nffprob) * OTFLineLbrHrsPerRmvl * \\ burdenedlaborrate + \dfrac{OTFMaintActions * OTFMBF * failprob(\text{flight})}{1000} * \\ OTFLineLbrHrsPerMaintAct * burdenedlaborrate,$$

wherein nffprob is defined as $$nff = \dfrac{OTFNFF}{100}$$

and burdenedlaborrate is defined as burdenedlaborrate=DirectLaborRate*(1+MaintLaborBurdenFactor)

(2) the shop labor cost and, if a spare is expendable, (3a) an expendable cost or, if a spare is not expendable, (3b) a shop material cost. In instances in which the spare is expendable, the shop labor cost and the expendable cost may be defined as follows:

otfshoplaborcost(flight)=nffprob*
  OTFShopLbrHrsPerUncfmFailure*burdenedlaborrate otfexpendablecost(flight)=(failprob(flight)+
  nffprob)*OTFSparePrice In instances in which the spare is not expendable, the shop labor cost and the shop material cost may be defined as follows:

otfshoplaborcost(flight)=(failprob(flight)*OTFShopLbrHrsPerFailure+
  nffprob*OTFShopLbrHrsPerUncfmFailure)*burdenedlaborrate otfshopmaterialcost(flight)=failprob(flight)*OTFAvgShopMatlCostPerFailure Additional non-inflated costs utilizing the operate to failure maintenance approach include schedule interruption costs including the costs of delay, cancellation, turnback, diversion and out of service days which may be determined as follows:

otfdelaycost(flight)=(failprob(flight)+nffprob)*
  OTFDelaysRate*OTFAvgDelayTime*DelayCostperDelayHour otfcancelcost(flight)=failprob(flight)*
  OTFCancellationsRate*CancelCostperCancellation otfatbcost(flight)=failprob(flight)*
  OTFATBRate*TurnbackCostperTurnback otfdivcost(flight)=failprob(flight)*
  OTFDiversionsRate*DiversionCostperDiversion otfoutdaycost(flight)=failprob(flight)*
  OTFSIOutOfServiceDaysRate*OutOfServiceCostperDay In addition, the expected number of removals of the respective equipment module over the lifetime of the structure is determined (block 166). The inflation per flight factors and the minimum rate of return per flight factors are then determined (block 168) and the cost components, such as the dependability cost components, for the respective equipment module are determined by combining the non-inflated costs for each flight with the per flight inflation factors and the minimum rate of return per flight factors (block 170). On exemplary set of equations for determining the inflation per flight factor geninflationperflight and the return per flight factor returnperflight are set forth below:

$$geninflationperflight = (1 + gi)^{\frac{1}{NumFlightsperYearperPlane}} - 1.0$$

$$returnperflight = (1 + marr)^{\frac{1}{NumFlightsperYearperPlane}} - 1.0$$

Based on these return factors, the maintenance and schedule interruption costs over the system life utilizing the operate to failure maintenance approach may be determined as follows:

$$otfnpvlinelaborcost = fleetsize * qpa * \sum_{k=1}^{lifelights} otflinelaborcost(k) * \left(\frac{1 + geninflationperflight}{1 + returnperflight}\right)^k$$

$$otfnpvshoplaborcost = fleetsize * qpa * \sum_{k=1}^{lifelights} otfshoplaborcost(k) * \left(\frac{1 + geninflationperflight}{1 + returnperflight}\right)^k$$

$$otfnpvexpendablecost = fleetsize * qpa * \sum_{k=1}^{lifelights} otfexpendablecost(k) * \left(\frac{1 + geninflationperflight}{1 + returnperflight}\right)^k$$

$$otfnpvshopmaterialcost = fleetsize * qpa * \sum_{k=1}^{lifelights} otfshopmaterialcost(k) * \left(\frac{1 + geninflationperflight}{1 + returnperflight}\right)^k$$

$$otfnpvdelaycost = fleetsize * qpa * \sum_{k=1}^{lifelights} otfdelaycost(k) * \left(\frac{1 + geninflationperflight}{1 + returnperflight}\right)^k$$

$$otfnpvcancelcost = fleetsize * qpa * \sum_{k=1}^{lifelights} otfcancelcost * \left(\frac{1 + geninflationperflight}{1 + returnperflight}\right)^k$$

$$otfnpvatbcost = fleetsize * qpa * \sum_{k=1}^{lifelights} otfatbcost(k) * \left(\frac{1 + geninflationperflight}{1 + returnperflight}\right)^k$$

-continued $$otfnpvdivcost = fleetsize * qpa * \sum_{k=1}^{lifelights} otfdivcost(k) * \left(\frac{1 + geninflationperflight}{1 + returnperflight}\right)^k$$

$$otfnpvoutdaycost = fleetsize * qpa * \sum_{k=1}^{lifelights} otfoutdaycost(k) * \left(\frac{1 + geninflationperflight}{1 + returnperflight}\right)^k$$

The cost components that are independent of failures are determined for the respective equipment module (block 172). For example, the energy cost component for the respective equipment module may typically be a cost that is independent of failures. For example, the net present value of the weight fuel cost, energy fuel cost, block fuel cost and insurance may be defined as follows:

otfnpvweightfuelcost=fleetsize*qpa*
OTFPartWeight*NumFlightsperYearperPlane*
FlightHoursperFlight*FuelBurnFactorWeight/
6.75*FuelCost*Fuel*Npv*Factor otfnpvenergyfuelcost=fleetsize*qpa*
OTFPartDirect*HPRqmt**NumFlightsperYearperPlane*
FlightHoursperFlight/
6.75*FuelCost*Fuel*Npv*Factor otfnpvblockfuelcost=fleetsize*qpa*
OTFPartLbsOfFuelPerBlockTrip*
NumFlightsperYearperPlane/
6.75*FuelCost*Fuel*Npv*Factor otfnpvinsurance=SysAcqCostPerFleet*
Insurancefactor*Gen*Npv*Factor The required number of spares, the spares acquisition cost and the spares holding cost for the respective equipment module are determined using the expected number of removals over the lifetime of the structure and the input parameters related to spares (block 174) and may be determined, for example, as follows:

$$otffailures = \sum_{k=1}^{lifelights} failprob(k)$$

$otffailrate = otffailures / lifehours$ wherein $lifehours$ is defined as $lifehours = lifelights * FlightHoursperFlight$ $nffrate = nffprob / FlightHoursperFlight$ wherein $nffprob$ is defined as $$nffprob = \frac{nff}{1 - nff} * \frac{FlightHoursperFlight}{OTFMTBF}$$

$otfremovalrate = otffailrate + nffrate$ $adjmtbur = 1 / otfremovalrate$ $Avgunithrsperyear =$ $qpa * fleetsize * NumFlightsperYearperPlane * FlightHoursperFlight$ $Avgsparesdemand = Avgunithsperyear * [$ $$OTFSparesTurnAroundTime / 365] * \left[\frac{1}{adjmtbur}\right]$$

-continued $$otfspares = \text{Min } k \ni CDFPoisson(k, Avgsparesdemand) \geq$$
$$OTFSparesMainBaseFillRate$$

$$otfnpvsparesacqcost = otfspares * OTFSparePrice$$

$$otfnpvsparesholdingcost =$$
$$otfnpvsparesacqcost * SparesHoldingFactor * GenNpvFactor$$

The total costs over the lifetime of the structure for the respective equipment module are then determined by summing all of the cost components (block 176). Thus, in the embodiment associated with the examples described above, the cost components include maintenance costs, fuel costs, schedule interruption costs and spares costs. The total costs for each month over the lifetime of the structure also may be determined by combining, such as by summing, the non-inflated costs for flights in each respective month, inflation, return factors, the spares holding cost, and the energy cost for the respective equipment module and for the respective month (block 178).

The embodiment of the method and system 20 illustrated by the flow chart of FIG. 11 then determines whether the user wants to perform an equipment module analysis based upon the prognostics maintenance approach for the respective equipment module (block 180), such as by checking whether the user entered "NO" in the prognostic maintenance approach segment for the respective equipment module as indicated by options 66 of FIG. 9A. If the user wants to perform the equipment module analysis based upon the prognostics maintenance approach, then the costs, such as the total and/or monthly costs, for the respective equipment modules are determined (block 182). One embodiment of the method and system 20 in which the equipment module analysis is performed based upon the prognostics maintenance approach for a respective equipment module is illustrated by the flowchart of FIG. 14.

The flowchart of FIG. 14 is similar to that of FIG. 13 except that the costs are determined based upon the prognostics maintenance approach cost equations instead of the operate-to-failure maintenance approach cost equations. For example, the embodiment of FIG. 14 begins by reading the structure, system, economic and respective equipment module input parameters into local holding variables (block 184). The net present value multiplier factors for general price inflation and fuel price inflation are determined over the lifetime of the structure (block 186) utilizing net present value equations, such as those provided above. The total number of flights of average flight length over the lifetime of the structure, when the structure is an aircraft, is determined (block 188). Arrays in which to store, such as in storage element 28, non-inflated costs for each flight are allocated (block 190). The non-inflated costs for each flight are determined based upon the cost equations for the prognostics maintenance approach using the failure probability (defined as in the same manner as described above in conjunction with the operate to failure approach) for the respective equipment module in each flight and the equipment module and other input parameters (block 192). Exemplary non-inflated costs include maintenance costs and schedule interruption costs which may be determined in a prognostics maintenance approach may be defined as follows:

$$proglinelaborcost(flight) =$$
$$\left(failprob(\text{flight}) * \left(1 + \frac{correct * false}{1 - false}\right) + (1 - totalfmtargeted) * nffprob\right) *$$
$$OTFLineLbrHrsPerRmvl * burdenedlaborrate$$

wherein correct is defined as: $correct = \frac{ProgSuccessPcnt}{100}$, false is defined as : $false = \frac{ProgFalseAlarmsPerRmvl}{100}$, and totalfmtargeted is defined as: $totalfmtargetd = \frac{ProgTotalFMPercent}{100}$ $$proglinelaborcost(\text{flight}) = proglinelaborcost(\text{flight}) +$$
$$\frac{OTFMaintActions * OTFMTBF * failprob(\text{flight}) * (1 - correct)}{100} *$$
$$OTFLineLbrHrsPerMaintAct * burdenedlaborrate$$

If OTFSparesExpendable="Yes"

$$progshoplaborcost(\text{flight}) =$$
$$\left(failprob(\text{flight}) * \frac{correct * false}{1 - false} + (1 - totalfmtargeted) * nffprob\right) *$$
$$OTFShopLbrHrsPerUncfmFailure * burdenedlaborrate$$

$$progexpendablecost(\text{flight}) =$$
$$\left(failprob(\text{flight}) * \left(1 + \frac{correct * false}{1 - false}\right) + (1 - totalfmtargeted) * nffprob\right) *$$
$$ProgCostPerUnit$$

Else If OTFSparesExpendable="No"

$$progshoplaborcost(\text{flight}) =$$
$$\Big(failprob(\text{flight}) * (1 - correct) * OTFShopLbrHrsPerfailure +$$
$$failprob(\text{flight}) * correct * ProgShopLaborHrsPerJustRmvl +$$
$$\left(failprob(\text{flight}) * \frac{correct * false}{1 - false} + (1 - totalfmtargeted) * nffprob\right) *$$
$$OTFShopLbrHrsPerUncfmFailure\Big) * burdenedlaborrate$$

progshopmaterialcost(flight)=failprob(flight)*(1−correct)*$OTF$AvgShopMatlCostPerFailure+failprob(flight)*correct*ProgShopMatlCostPerJustRmvl End If progdelaycost(flight)=(failprob(flight)*(1−correct)+(1−total*fm*targeted)*$nff$prob)*$OTF$DelaysRate*$OTF$AvgDelayTime*DelayCostperDelayHour progcancelcost(flight)=failprob(flight)*(1−correct)*$OTF$CancellationsRate*CancelCostperCancellation progat*b*cost(flight)=failprob(flight)*(1−correct)*$OTFATB$Rate*TurnbackCostperTurnback progdivcost(flight)=failprob(flight)*(1−correct)*$OTF$DiversionsRate*DiversionCostperDiversio progoutdaycost(flight)=failprob(flight)*(1−correct)*$OTFSI$OutOfServiceDaysRate*OutOfServiceCostperDay In addition, the expected number of removals for the respective equipment module over the lifetime of the structure are determined (block 192). The inflation per flight factors and the minimum rate of return factors are then determined (block 194) as described above and the cost components, such as the dependability cost components, for the respective equipment module are determined by combining the non-inflated costs for each flight with the per flight inflation factors and the minimum rate of return factors (block 196). In the prognostics maintenance approach, the maintenance and schedule interruption costs can be determined over the life of the system as follows:

$$prognpvlinelaborcost = fleetsize * progqpa * \sum_{k=1}^{lifeflights} proglinelaborcost(k) * \left(\frac{1 + geninflationperflight}{1 + returnperflight}\right)^k$$

$$prognpvshoplaborcost = fleetsize * progqpa * \sum_{k=1}^{lifeflights} progshoplaborcost(k) * \left(\frac{1 + geninflationperflight}{1 + returnperflight}\right)^k$$

$$prognpvexpendablecost = fleetsize * progqpa * \sum_{k=1}^{lifeflights} progexpendablecost(k) * \left(\frac{1 + geninflationperflight}{1 + returnperflight}\right)^k$$

$$prognpvshopmaterialcost = fleetsize * progqpa * \sum_{k=1}^{lifeflights} progshopmaterialcost(k) * \left(\frac{1 + geninflationperflight}{1 + returnperflight}\right)^k$$

$$prognpvdelaycost = fleetsize * progqpa * \sum_{k=1}^{lifeflights} progdelaycost(k) * \left(\frac{1 + geninflationperflight}{1 + returnperflight}\right)^k$$

$$prognpvcancelcost = fleetsize * progqpa * \sum_{k=1}^{lifeflights} progcancelcost(k) * \left(\frac{1 + geninflationperflight}{1 + returnperflight}\right)^k$$

$$prognpvatbcost = fleetsize * progqpa * \sum_{k=1}^{lifeflights} progatbcost(k) * \left(\frac{1 + geninflationperflight}{1 + returnperflight}\right)^k$$

$$prognpvdivcost = fleetsize * progqpa * \sum_{k=1}^{lifeflights} progdivcost(k) * \left(\frac{1 + geninflationperflight}{1 + returnperflight}\right)^k$$

$$prognpvoutdaycost = fleetsize * progqpa * \sum_{k=1}^{lifeflights} progoutdaycost(k) * \left(\frac{1 + geninflationperflight}{1 + returnperflight}\right)^k$$

The cost components that are independent of failures are determined for the respective equipment module (block 198). For example, the energy cost component for the respective equipment module may typically be a cost that is independent of failures and may, for example, be determined in the prognostics maintenance approach as follows:

prog*npv*weightfuelcost=fleetsize\*prog*qpa*\*ProgPartWeight\*
  NumFlightsperYearperPlane\*FlightHoursperFlight\*
  FuelBurnFactorWeight/
  6.75\*FuelCost\*Fuel*Npv*Factor prog*npv*energyfuelcost=fleetsize\*prog*qpa*\*
  ProgPartDirect*HP*Rqmt\*NumFlightsperYearperPlane\*
  FlightHoursperFlight/
  6.75\*FuelCost\*Fuel*Npv*Factor prog*npv*blockfuelcost=fleetsize\*prog*qpa*\*
  ProgPartLbsOfFuelPerBlockTrip\*
  NumFlightsperYearperPlane/
  6.75\*FuelCost\*Fuel*Npv*Factor prog*npv*insurance=(SysAcqCostPerFleet+SysProg-
  CostPerFleet)\*Insurancefactor\**GenNpv*Factor The required number of spares, the spares acquisition cost and the spares holding cost for the respective equipment module may be determined in the prognostics maintenance approach using the expected number of removals over the lifetime of the structure and the input parameters related to spares (block 200) as follows:

$$progfailures = \sum_{k=1}^{lifeflights} failprob(k) * \left(1 + \frac{correct * false}{1 - false}\right)$$

$$progfailrate = progfailures / lifehours$$

$$nffrate = nffprob * (1 - totalfmtarget) / FlightHoursperFlight$$

$$progremovalrate = progfailrate + nffrate$$

$$adjmtbur = 1 / progremovalrate$$

$$Avgunithrsperyear =$$
$$progqpa * fleetsize * NumFlightsperYearperPlane * FlightHoursperflight$$

$$Avgsparesdemand =$$
$$Avgunithrsperyear * [OTFSparesTurnAroundTime / 365] * \left[\frac{1}{adjmtbur}\right]$$

$$progspares = \text{Min } k \ni CDFPoisson(k, Avgsparesdemand) \geq$$
$$OTFSparesMainBaseFillRate$$

$$prognpvsparesacqcost = progspares * ProgCostPerUnit$$

$$prognpvsparesholdingcost =$$
$$prognpvsparesacqcost * SparesHoldingFactor * GenNpvFactor$$

The total costs over the lifetime of the structure for the respective equipment module are then determined by summing all of the cost components (block 202). Thus, in the embodiment associated with the examples described above, the cost components include maintenance costs, fuel costs, schedule interruption costs and spares costs. The total costs for each month over the lifetime of the structure also may be determined by combining, such as by summing, the non-inflated costs for flights in each respective month, inflation, return factors, the spares holding cost, and the energy cost for the respective equipment module and for the respective month (block 204).

Once the equipment module analysis based upon the prognostics maintenance approach is completed or if it is determined that the user does not want to perform an equipment module analysis based upon the prognostics maintenance approach, then the method and system 20 of the embodiment of the present invention illustrated in FIG. 11 determines whether the user wants to perform an equipment module analysis based upon the scheduled maintenance approach for the respective equipment module (block 206), such as by checking whether the user entered "NO" in the scheduled maintenance approach segment for the respective equipment module as indicated by options 66 of FIG. 9A. If the user wants to perform the equipment module analysis based upon the scheduled maintenance approach, then the costs, such as the total and/or monthly costs, for the respective equipment modules are determined (block 208). One embodiment of the method and system 20 in which the equipment module analysis is performed based upon the prognostics maintenance approach for a respective equipment module is illustrated by the flowchart of FIGS. 15A and 15B.

The flowchart of FIGS. 15A and 15B is similar to those of FIGS. 13 and 14 except for some additional steps regarding the mean time between overhaul (MTBO) optimization. For example, if the user left the mean time between overhaul input parameter blank for the scheduled maintenance approach for a respective equipment module, then an optimized mean time between overhaul value is determined for the respective equipment module. The optimized MTBO value is the value that yields the lowest operating costs over the lifetime of the structure, in one embodiment of the method and system 20. Thus, the embodiment of FIG. 14 begins by determining whether the user has specified an MTBO value (block 210). If the user has specified an MTBO value, then that value is used as the optimum MTBO value (block 212). If the user did not specify an MTBO value, then the optimum MTBO is initialized to the system life and the scheduled approach optimal dependability costs are initialized to the operate-to-failure dependability costs, as further utilized below (block 214). The structure, system, economic and respective equipment module input parameters may then be read into local holding variables (block 216). The net present value multiplier factors for general price inflation and fuel price inflation are determined over the lifetime of the structure (block 218) utilizing net present value equations as described above. The inflation factors per flight and the minimum rate of return factors are also determined (block 218). The total number of flights of average flight length over one overhaul cycle of the MTBO length, when the structure is an aircraft, is determined (block 220) as follows:

$$flightspercycle = \min\left(lifeflights, \left[\frac{MTBO}{FlightHoursperFlight}\right]\right)$$

The number of overhaul cycles over the lifetime of the structure and the number of flights in any remainder partial overhaul cycle are then determined (block 220) as follows:

$$NumOverhaulCycles = \left\lfloor \frac{lifehours}{MTBO} \right\rfloor$$

$$partialcyclelights = \left\lceil \frac{lifehours - flightspercycle * FlightHoursperFlight}{FlightHoursperFlight} \right\rceil$$

The cost components, such as the dependability cost components, for the respective equipment module are determined by combining, such as by summing, the non-inflated operate-to-failure costs, which are determined as explained above, for each flight with the per flight inflation and the per flight minimum rate of return factors (block 222). Exemplary cost components include maintenance costs which may be determined in a scheduled maintenance approach on a per cycle basis as follows:

$npvlinelaborcostpercycle = fleetsize *$ $$qpa * \left[ \sum_{k=1}^{flightspercycle} otflinelaborcost(k) * \left(\frac{1 + geninflationperflight}{1 + returnperflight}\right)^k + \right.$$

$$OTFLineLbrHrsPerRmvl * burdenedlaborrate *$$

$$\left. \left(\frac{1 + geninflationperflight}{1 + returnperflight}\right)^{flightspercycle} \right]$$

$npvshoplaborcostpercycle = fleetsize *$ $$qpa * \left[ \sum_{k=1}^{flightspercycle} otfshoplaborcost(k) * \right.$$

$$\left. \left(\frac{1 + geninflationperflight}{1 + returnperflight}\right)^k \right]$$

If OTFSparesExpendable="Yes"

$npvexpendablecostpercycle = fleetsize * qpa *$ $$\left[ \sum_{k=1}^{flightspercycle} otfexpendablecost(k) * \left[\frac{1 + geninflationperflight}{1 + returnperflight}\right]^k + \right.$$

$$\left. OTFSparePrice * \left(\frac{1 + geninflationperflight}{1 + returnperflight}\right)^{flightspercycle} \right]$$

Else $npvshoplaborcostpercycle = npvshoplaborcostpercycle +$ $$fleetsize * qpa * \left[ SRLaborHrsPerOverhaul * \right.$$

$$\left. burdenedlaborrate * \left(\frac{1 + geninflationperflight}{1 + returnperflight}\right)^{flightspercycle} \right]$$

$npvshopmaterialcostpercycle = fleetsize * qpa *$ $$\left[ \sum_{k=1}^{flightpercycle} otfshopmaterialcost(k) * \right.$$

$$\left(\frac{1 + geninflationperflight}{1 + returnperflight}\right)^k +$$

$$SRAverageMatlPerOverhaul *$$

$$\left. \left(\frac{1 + geninflationperflight}{1 + returnperflight}\right)^{flightspercycle} \right]$$

End If

And on a partial cycle basis as follows:

$$\text{partialcyclenpvlinelaborcost} = \text{fleetsize} * qpa *$$

$$\left[ \sum_{k=1}^{\text{partialcycleflights}} \text{otflinelaborcost}(k) * \left( \frac{1 + \text{geninflationperflight}}{1 + \text{returnperflight}} \right)^k \right]$$

$$\text{partialcyclenpvshoplaborcost} =$$

$$\text{fleetsize} * qpa * \left[ \sum_{k=1}^{\text{partialcycleflights}} \text{otfshoplaborcost}(k) * \left( \frac{1 + \text{geninflationperflight}}{1 + \text{returnperflight}} \right)^k \right]$$

If OTFSparesExpendable="Yes"

$$\text{partialcyclenpvexpendablecost} = \text{fleetsize} * qpa *$$

$$\left[ \sum_{k=1}^{\text{partialcycleflights}} \text{otfexpendablecost}(k) * \left( \frac{1 + \text{geninflationperflight}}{1 + \text{returnperflight}} \right)^k \right]$$

Else $$\text{partialcyclenpvshopmaterialcost} = \text{fleetsize} * qpa *$$

$$\left[ \sum_{k=1}^{\text{partialcycleflights}} \text{otfshopmaterialcost}(k) * \left( \frac{1 + \text{geninflationperflight}}{1 + \text{returnperflight}} \right)^k \right]$$

End If

The per cycle and partial cycle maintenance costs can then be combined as follows:

Sched$npv$linelaborcost=$npv$linelaborcostpercycle*$fac3$+partialcycle$npv$linelaborcost*$fac2$ Sched$npv$shoplaborcost=$npv$shoplaborcostpercycle*$fac3$+partialcycle$npv$shoplaborcost*$fac2$ Sched$npv$expendablecost=$npv$expendablecostpercycle*$fac3$+partialcycle$npv$expendablecost*$fac2$ Sched$npv$shopmaterialcost=$npv$shopmaterialcostpercycle*$fac3$+partialcycle$npv$shop materialcost*$fac2$ wherein $fac3$ is defined as $fac3 = \frac{1 - fac2}{1 - fac1}$, $fac2$ is defined as $fac2 = fac1^{\text{NumOverhaulCycles}}$, and $fac1$ is defined as $$fac1 = \left( \frac{1 + \text{geninflationperflight}}{1 + \text{returnperflight}} \right)^{\text{flightspercycle}}$$

Similarly, the schedule interruption costs can be determined on a per cycle basis as follows:

$$\text{npvdelaycostpercycle} = \text{fleetsize} *$$

$$qpa * \left[ \sum_{k=1}^{\text{flightspercycle}} \text{otfdelaycost}(k) * \left( \frac{1 + \text{geninflationperflight}}{1 + \text{returnperflight}} \right)^k \right]$$

-continued $$\text{npvcancelcostpercycle} = \text{fleetsize} *$$

$$qpa * \left[ \sum_{k=1}^{\text{flightspercycle}} \text{otfcancelcost}(k) * \left( \frac{1 + \text{geninflationperflight}}{1 + \text{returnperflight}} \right)^k \right]$$

$$\text{npvatbcostpercycle} = \text{fleetsize} *$$

$$qpa * \left[ \sum_{k=1}^{\text{flightspercycle}} \text{otfatbcost}(k) * \left( \frac{1 + \text{geninflationperflight}}{1 + \text{returnperflight}} \right)^k \right]$$

$$\text{npvdivcostpercycle} = \text{fleetsize} *$$

$$qpa * \left[ \sum_{k=1}^{\text{flightspercycle}} \text{otfdivcost}(k) * \left( \frac{1 + \text{geninflationperflight}}{1 + \text{returnperflight}} \right)^k \right]$$

$$\text{npvoutdaycostpercycle} = \text{fleetsize} *$$

$$qpa * \left[ \sum_{k=1}^{\text{flightspercycle}} \text{otfoutdaycost}(k) * \left( \frac{1 + \text{geninflationperflight}}{1 + \text{returnperflight}} \right)^k \right]$$

And on a partial cycle basis as follows:

$$\text{partialcyclenpvdelaycost} = \text{fleetsize} *$$

$$qpa * \left[ \sum_{k=1}^{\text{partialcycleflights}} \text{otfdelaycost}(k) * \left( \frac{1 + \text{geninflationperflight}}{1 + \text{returnperflight}} \right)^k \right]$$

$$\text{partialcyclenpvcancelcost} = \text{fleetsize} *$$

$$qpa * \left[ \sum_{k=1}^{\text{partialcycleflights}} \text{otfcancelcost}(k) * \left( \frac{1 + \text{geninflationperflight}}{1 + \text{returnperflight}} \right)^k \right]$$

$$\text{partialcyclenpvatbcost} = \text{fleetsize} *$$

$$qpa * \left[ \sum_{k=1}^{\text{partialcycleflights}} \text{otfatbcost}(k) * \left( \frac{1 + \text{geninflationperflight}}{1 + \text{returnperflight}} \right)^k \right]$$

$$\text{partialcyclenpvdivcost} = \text{fleetsize} *$$

$$qpa * \left[ \sum_{k=1}^{\text{partialcycleflights}} \text{otfdivcost}(k) * \left( \frac{1 + \text{geninflationperflight}}{1 + \text{returnperflight}} \right)^k \right]$$

$$\text{partialcyclenpvoutdaycost} = \text{fleetsize} *$$

$$qpa * \left[ \sum_{k=1}^{\text{partialcycleflights}} \text{otfoutdaycost}(k) * \left( \frac{1 + \text{geninflationperflight}}{1 + \text{returnperflight}} \right)^k \right]$$

The per cycle and partial cycle schedule interruption costs can then be combined as follows:

Sched$npv$delaycost=$npv$delaycostpercycle*$fac3$+partialcycle$npv$delay cost*$fac2$ Sched$npv$cancelcost=$npv$cancelcostpercycle*$fac3$+partialcycle$npv$cancelcost*$fac2$ Sched$npv$at bcost=$npv$atbcostpercycle*$fac3$+partialcycle$npv$atbcost*$fac2$ Sched$npv$divcost=$npv$divcostpercycle*$fac3$+partialcycle$npv$divcost*$fac2$ Sched$npv$outdaycost=$npv$outdaycostpercycle*$fac3$+partialcycle$npv$outdaycost*$fac2$ The expected number of removals of the respective equipment module in an overhaul cycle are also determined (block 222). The cost components that are independent of failures are determined for the respective equipment module (block 224). For example, the energy cost component for the respective equipment module may typically be a cost that is independent of failures and may be determined in a scheduled maintenance approach as follows:

Sched$npv$weightfuelcost=fleetsize*$qpa$*$OTF$PartWeight*
NumFlightsperYearperPlane*FlightHoursperFlight*
FuelBurnFactorWeight/
6.75*FuelCost*Fuel$Npv$Factor Sched$npv$energyfuelcost=fleetsize*$qpa$*$OTF$PartDirect$HP$Rqmt*
NumFlightsperYearperPlane*FlightHoursperFlight/6.75*
FuelCost*Fuel$Npv$Factor Sched$npv$blockfuelcost=fleetsize*$qpa$*
$OTF$PartLbsOfFuelPerBlockTrip*
NumFlightsperYearperPlane/
6.75*FuelCost*Fuel$Npv$Factor Sched$npv$insurance=SysAcqCostPerFleet*
Insurancefactor*Gen$Npv$Factor The required number of spares, the spares acquisition cost and the spares holding cost for the respective equipment module may be determined in the scheduled maintenance approach using the expected number of removals in an overhaul cycle and the input parameters related to spares (block 226) as follows:

$$schedfailures = \sum_{k=1}^{flightspercycle} failprob(k)$$

$$schedfailrate = schedfailures / MTBO$$

$$nffrate = nffprob / FlightHoursperFlight$$

$$schedremovalrate = schedfailrate + nffrate$$

$$adjmtbur = 1 / schedremovalrate$$

$$Avgunithrsperyear = qpa * fleetsize * NumFlightsperYearperPlane * FlightHoursperFlight$$

$$Avgsparesdemand = Avgunithrsperyear * [OTFSparesTurnAroundTime / 365] * \left[\frac{1}{adjmtbur} + \frac{1}{MTBO}\right]$$

$$schedspares = \text{Min } k \ni CDFPoisson(k, Avgsparesdemand) \geq OTFSparesMainBaseFillRate$$

$$Schednpvsparesacqcost = schedspares * OTFSparePrice$$

$$Schednpvsparesholdingcost = Schednpvsparesacqcost * SparesHoldingFactor * GenNpvFactor$$

The total costs over the lifetime of the structure for the respective equipment module are then determined by summing all of the cost components (block 228). Thus, in the embodiment associated with the examples described above, the cost components include maintenance costs, fuel costs, schedule interruption costs and spares costs. If the user specified a MTBO (block 230), then the total structure cost for each month over the structure lifetime may also be determined by summing the non-inflated operate-to-failure costs and the overhaul costs, as determined above, inflation, return factors, optimum MTBO, the spares holding cost and the energy cost for the respective equipment module and for the respective month (block 240).

If the user did not specify an MTBO, as determined in block 210, as explained above, or as determined in block 230 in the same way as in block 210, then the method and system 20 of this embodiment of the present invention for determining the costs associated with a scheduled maintenance approach for a respective equipment module determines whether the total costs for the respective equipment module are less than the optimal costs for the respective equipment module based upon the scheduled maintenance approach (block 232). If so, then a new optimum MTBO is established for the respective equipment module and the schedule maintenance approach optimal dependability cost is assigned the calculated net present value dependability cost for the respective equipment module, as calculated using the new optimum MTBO (block 234). The scheduled dependability cost will continue to be determined for each overhaul increment of MTBO, but a new scheduled approach optimal dependability cost is established only if the respective equipment module's net present value dependability cost is lower than the previously calculated optimum dependability cost. If the calculated net present value dependability cost for the respective equipment module is equal or higher than the previously established schedule approach dependability cost (block 232), then the previously established scheduled approach optimal dependability cost and optimum MTBO (block 234) is stored and the MTBO is incremented to a higher value by adding one overhaul interval increment (block 236).

The method and system 20 of this embodiment of the present invention then determine if the MTBO is greater than or equal to the lifetime of the structure (block 238). If so, then the iterative optimization loop (blocks 220 to 238) is halted and the total costs for each month over the lifetime of the structure also may be determined by combining the non-inflated operate-to-failure costs, as determined above, inflation, return factors, optimum MTBO, the spares holding cost, and the energy cost for the respective equipment module and for the respective month (block 240).

Regardless of whether the user has requested an optimized mean time between overhaul value for the scheduled maintenance approach as described above, when determining the costs of each equipment module under the desired maintenance approach(es), the user may also have the option of specifying a value for incrementing a Mean Time Between Overhaul (MTBO) optimization interval feature. In one embodiment of the present invention, the increment is set to a default of two percent of the life hours of the structure, but the default increment may be changed to any other value, if desired. In this embodiment, life hours is defined as the life years of the structure multiplied by the number of flights per year multiplied by the number of flight hours per flight. The smaller the increment, however, the more calculations are required to determine the costs, such that the time involved in evaluating the costs of the equipment module(s) may increase as the increment decreases. The overhaul interval is then utilized to increment the MTBO (block 236) at each pass through the optimization code until MTBO is set to be equal to or greater than life hours (block 238).

The method and system 20 of the embodiment illustrated in FIG. 11 then store, such as in storage element 28, the total and/or monthly costs determined based upon the selected maintenance approach(es) for the respective equipment module in intermediate data sheets (block 242). The method and system 20 determine whether another equipment module needs to be analyzed (block 244), such as an alternate equipment module. If so, then the next equipment module that has input parameters associated with it is analyzed (block 246), such as by the processes described above. If not, then the equipment module analysis is finished unless there is a subsequent change to any of the input parameters that would affect the equipment module analysis for one or more of the equipment modules, unless the user initiates further equipment module analysis for one or more of the equipment modules or unless further equipment module analysis is triggered in any other automatic or manual manner.

FIGS. 16A and 16B illustrate one embodiment of the baseline cost evaluations for two baseline equipment modules and the alternate cost evaluations for two alternate equipment modules. The cost evaluations were performed utilizing the aircraft level input parameters shown in FIG. 5, the system level input parameters shown in FIG. 6, the economic input parameters of FIG. 8, and the equipment module input parameters of FIGS. 9A, 9B and 9C. As shown in the embodiment of FIGS. 16A and 16B, the costs associated with the operate-to-failure (OTF) maintenance approach, the scheduled maintenance approach, and the prognostic maintenance approach were determined for the baseline and alternate equipment modules 1, while the OTF maintenance approach and the prognostic maintenance approach were determined for the baseline and alternate equipment modules 2. Because "NO" was entered for the baseline and alternate equipment modules 2 in the segment associated with the scheduled maintenance approach evaluation option in portion 66 of the chart shown in FIG. 9A, the scheduled maintenance approach was not evaluated for the baseline or alternate equipment modules 2.

The cost components shown in the embodiment of FIGS. 16A and 16B are based upon the factors of the dependability cost theory, as described above, but any other type of cost breakdown based on any other type of cost theory may be utilized. The cost components shown in FIGS. 16A and 16B for each of the calculated maintenance approaches for each of the baseline and alternate equipment modules are the fuel cost, the line maintenance cost, the shop maintenance cost, the schedule interruption cost, the spares cost, the expendable material cost, and the recurring prognostics cost. The sum of all of the cost components for each maintenance approach for each baseline and alternate equipment module is shown as the total amount in the embodiment of FIGS. 16A and 16B. A selection option 76, shown in FIG. 3, is associated with each of the maintenance approaches for each baseline and alternate equipment module. As such, the user may select the desired maintenance approach for each baseline and alternate equipment module (block 80), as shown in the flow chart of FIG. 2. For example, regarding the embodiment of FIGS. 16A and 16B, if the user wanted the lowest total cost maintenance approach for each baseline and alternate equipment module, the user would select the prognostic maintenance approach for the baseline and alternate equipment modules 1 and the OTF maintenance approach for the baseline and alternate equipment modules 2. FIGS. 16A and 16B illustrate that the user has selected the prognostic maintenance approach for the baseline equipment module 1, but has selected the OTF maintenance approach for the alternate equipment module 1 and for the baseline and alternate equipment modules 2 by selecting the respective selection options 76.

In some embodiments of the method and system 20 of the present invention, at any time prior to the determination of all of the costs associated with all of the equipment modules and the structure, as described in detail below, the user may indicate that a sensitivity analysis should be performed for at least one of the input parameters associated with at least one of the baseline or alternate equipment modules. For example, in the embodiment shown in FIG. 3, the user may select the box 78 associated with the "Include Sensitivity Calculations" heading to indicate to the processing element 24 that the user desires a sensitivity analysis for one or more of the input parameters. The sensitivity analysis quantifies the impact of unit changes in one or more of the input parameters on the total costs for all of the equipment modules and the structure. For example, in one embodiment, the sensitivity analysis determines the impact on the costs resulting from a predetermined percentage change, such as a +/−one percent change, in one or more of the input parameter values. For input values that can only be an integer, such as the Prognostic Quantity per Airplane, then the sensitivity analysis may determine the impact on the costs resulting from a one integer unit increase and decrease from the parameter value. A detailed description of the sensitivity analysis is described below in relation to the structure analysis and FIGS. 18A and 18B.

The user may select the input parameters for which it is desired the sensitivity analysis be performed at any time prior to the cost evaluation for all of the equipment modules and the structure, in certain embodiments of the method and system 20. For example, in one embodiment, the user may select the input parameters for which it is desired the sensitivity analysis be performed (block 82) after selecting the desired maintenance approach for each baseline and alternate equipment module, as shown in the flow chart of FIG. 2. In other embodiments, certain input parameters may be set as defaults to be utilized in the sensitivity analysis. In further embodiments, sensitivity analysis may be performed for all or only certain ones of the input parameters automatically during the cost evaluation for all of the equipment modules and structure.

FIGS. 18A and 18B are flow charts of one embodiment for performing the sensitivity analysis according to the method and system 20 of the present invention. FIG. 18A illustrates an overview of one embodiment of a sensitivity analysis. For example, the previously determined baseline and alternate, if any, cost components of the dependability costs for all equipment modules are read (block 280). A sensitivity report template is then accessed (block 282). The sensitivities for each cost component of the dependability costs for each baseline equipment module and each alternate equipment module, if any, are determined (blocks 284, 286). FIG. 18B is a flow chart illustrating how the sensitivities for each cost component of the dependability costs for each baseline equipment module and alternate equipment module, if any, are determined. For example, an equipment module is selected (block 288) and the previously determined probability of failure for the respective equipment module for each flight in the life of the structure is read (block 290). The user-selected maintenance approach is also read for the respective equipment module (block 292). The number of user-selected input parameters on which to perform the sensitivity analysis is then read for the respective equipment module and maintenance approach (block 294). Storage is allocated, such as in storage element 28, for arrays, such as sensitivity Jacobian arrays as explained further below, having a length equal to the number of user-selected input parameters on which the sensitivity analysis is to be performed for the respective equipment module and the arrays are initialized by entering the initial value of each input parameter in the array (block 296). One of the input parameters is then chosen (block 298) and, based upon the maintenance approach associated with the respective equipment module, the sensitivity of each of the dependability cost components for a percentage, such as a one percent, increase and/or decrease in the parameter value is determined (block 300). To determine the sensitivity, the cost components determined from the percentage increase are summed and the cost components determined from the percentage decrease are summed to obtain total dependability cost sensitivities for the increase and/or decrease in the user-selected input parameters (block 300).

The sensitivity analysis may be performed utilizing the Jacobian method and/or the Secant method based upon the type of input parameter, as known to those skilled in the art, in one embodiment of the method and system 20. For inputs that generally have a linear impact on costs, the Jacobian method is typically utilized. In other words, suppose the NPV cost function for an LRU for any maintenance approach is linear in the parameter of interest. Then the Jacobian method will yield the constant slope of the function which is the sensitivity. The following defines the sensitivity for a 1% change to the parameter. Note that since sensitivity is constant this can be used for cost extrapolation to any value of the parameter from the nominal value with no loss of accuracy.

$$LRUNPVCostSens = \frac{LRUNPVCost(\text{parameter})}{\text{parameter}} * 0.01 * \text{parameter}$$
$$= LRUNPVCost(\text{parameter}) * 0.01$$

For inputs that generally have a non-linear impact on costs, and if the cost equation is analytically differentiable for that input, the Jacobian method is also typically utilized. Suppose the NPV cost function for an LRU for any maintenance approach is non-linear in the parameter of interest. Then a measure of sensitivity of the cost to the parameter can be obtained by means of the Jacobian method. The Jacobian method will yield the slope of the function at the nominal value of the parameter which is the sensitivity. The following defines the Jacobian sensitivity for a 1% change to the parameter. Note that since function is non-linear the sensitivity varies with the parameter and can be used for small to moderate extrapolation to any value of the parameter from the nominal value with little loss of accuracy.

$$LRUNPVCostSens(\text{parameter}) =$$
$$\frac{\partial(LRUNPVCost(\text{parameter}))}{\partial(\text{parameter})} * 0.01 * \text{parameter}$$

For all other cases, a modified Secant method is typically utilized to define sensitivities, which typically differ to the right and left of the nominal value of the parameter. The Modifed Secant method works as follows. The cost function is evaluated at the 110% and 120% of the nominal value of the parameter. Then the least-squares fit for the true cost function is computed using the cost at 100%, 110% and 120% of the nominal value. The slope of this least-squares line is an approximate Secant sensitivity to the cost function to the right of the nominal value of the parameter. Similarly the cost function is evaluated for 90% and 80% of the nominal value of the parameter. Then the least-squares fit for the true cost function is computed using the cost at 100%, 90% and 80% of the nominal value. The slope of this least-squares line is an approximate Secant sensitivity to the cost function to the left of the nominal value of the parameter. Note that the least squares is conducted using the percent scale for the parameter and not the absolute values, i.e. the predictor variable is in percent while the response variable (such as cost) is in NPV dollars. This insures that the sensitivity is expressed in a percentage change in the parameter. Note that since function is non-linear the sensitivity varies with the parameter and can be used for small to moderate (up to 20%) extrapolation to any value of the parameter from the nominal value with little loss of accuracy. The mathematical expressions for the sensitivity to the right and left of the nominal value may be expressed as:

$$LRUNPVCostSensRight(\text{parameter}) =$$
$$\text{Slope}(LeastSquaresLine(LRUNPVCost(\text{nominal}),$$
$$LRUNPVCost(\text{nominal}*1.10), LRUNPVCost(\text{nominal}*1.20))$$
$$LRUNPVCostSensLeft(\text{parameter}) =$$
$$\text{Slope}(LeastSquaresLine(LRUNPVCost(\text{nominal}),$$
$$LRUNPVCost(\text{nominal}*0.90), (LRUNPVCost(\text{nominal}*0.80))$$

FIG. 22 illustrates a cost curve with the tangent and secant lines as described above. In other embodiments of the method and system 20, however, any other method that analyzes the sensitivity of any type of results to changes in one or more input parameter may be utilized.

The above process is completed for each user-selected input parameter (blocks 302, 304). The dependability cost sensitivities based on the user-selected input parameters for the respective equipment module and selected maintenance approach are then stored (block 306), such as in the array described above, and entered into the sensitivity report template to create the sensitivity report, and example of which is illustrated in FIG. 20. The above process is then completed for each equipment module (blocks 308, 310) and the resulting dependability cost sensitivities are also stored and entered into the sensitivity report template to create the sensitivity report for the baseline and alternate, if any, structure.

The user may wish to modify one or more of the input parameters after the equipment module analysis is run (block 84) or at any other time during the cost evaluation procedure, such as after the structure analysis is performed (block 108), as shown in the flow chart of FIG. 2. If the user modifies any of the input parameters, the user then may run the equipment module analysis (block 72) again and obtain new cost evaluations of FIGS. 16A and 16B based upon the modified input parameter(s). In addition, the user may wish to indicate that the sensitivity analysis should be performed with the modified input parameter(s). For example, in one embodiment of the method and system 20 of the present invention, the user may select the box 86 associated with the "Re-Calculate Sensitivity" heading to indicate to the processing element 24 that the user desires a sensitivity analysis for one or more of the modified input parameters in the same way as described herein regarding the initial sensitivity analysis.

After the equipment module analysis is completed, the structure analysis may be performed (block 90), shown in the flow chart of FIG. 2, such as by selecting the "Run Final Model" option 88, shown in FIG. 3. The structure analysis sums all of the costs of the baseline equipment modules for a baseline structure analysis and sums all of the costs of the alternate equipment modules for an alternate structure analysis. In addition, the structure analysis incorporates the acquisition system costs and any other economic factors to perform various types of analyses regarding the baseline and/or alternate structure costs, as described below.

FIG. 17 illustrates one embodiment of a structure analysis. The embodiment of FIG. 17 begins by initializing system level baseline and alternate cost variables and acquisition cost variables (block 248) to set the initial values of the variables to zero or a predefined default and to set the array sizes. Storage, such as in storage element 28, is also allocated for the equipment module cost variables and for the cost benefit between any alternate design and the baseline design (block 248). The maintenance approach that was selected by the user for each baseline and alternate, if any, equipment module is then read (block 250). The equipment module costs that were stored in the intermediate data sheets as described above are loaded into the equipment module cost variables (block 252). The acquisition costs for the baseline design and any alternate design are then determined by summing all of the initial costs, such as acquisition and training costs, for each equipment module having the selected maintenance approach that is included in the respective design (block 254). The costs, such as the monthly costs, for the baseline and any alternate equipment modules with the user selected maintenance approach, which were determined and stored as described in the equipment module analysis above, are read (block 256). The costs, such as the monthly costs, for the baseline design are determined by summing the costs, such as the monthly costs, for each equipment module in the baseline design (block 258). The costs, such as the monthly costs, for the alternate design, if any, are determined by summing the costs, such as the monthly costs, for each equipment module in the alternate design (block 260).

The cost benefit, such as per month for each month over the lifetime of the structure, may then be determined by subtracting the respective alternate cost from the respective baseline cost (block 262). When the time period for determining costs is monthly, then the breakeven month is determined based upon the acquisition costs in the first month and the monthly sustaining cost benefits (block 264). The breakeven month is the month beyond which the monthly cumulative cost benefit is positive. For example, this may be the month in which the total alternate cumulative cost curve (acquisition and sustaining) intersects with the baseline cumulative monthly cost curve. The internal rate of return on the acquisition initial investment is also determined in any manner known to those skilled in the art (block 264). The internal rate of return is the discount rate (minimum rate of return) on an acquisition that equates the present value of its cash outflow to the present value of its cash inflow. Any type of report based upon the determined costs for the equipment modules and/or the baseline and alternate, if any, design may also be created (block 266). Examples of these reports, such as a customer cost impact report, a customer cost benefit report, a cost of ownership report, a cost summary report, a cost by equipment module report, and a spares report are further described below. Although the above embodiments describe determining and utilizing the monthly costs for the analyses, any other desired time period may be utilized in other embodiments.

The method and system 20 of the embodiment of the structure analysis illustrated in FIG. 17 then determines whether the user indicated that the sensitivity of one or more of the input parameters should be determined (block 268), as described above. In alternative embodiments, the sensitivity analysis may be performed automatically for one or more of the input parameters. If not, then the structure analysis concludes and the results are stored and/or presented to the user. If the user did request a sensitivity analysis, then the sensitivity analysis is performed (block 270), as described above with respect to the embodiment of FIGS. 18A and 18B, and a sensitivity report is created (block 272), one embodiment of which is described below with respect to FIG. 20.

FIGS. 19A and 19B illustrate one embodiment of the presentation of the acquisition and sustaining costs associated with each of the selected maintenance approaches for each of the baseline and alternate equipment modules and the total acquisition and sustaining costs for each of the baseline and alternate structures. Various other types of analyses may be performed based upon the costs determined for the overall baseline and/or alternate structure. These analyses may be embodied in reports from which the user may select (block 92), as shown in the flow chart of FIG. 2. For example, if the sensitivity analysis was performed for input parameters of the baseline equipment modules, as described above, then the report of FIG. 20 may be available to the user. If an analysis of alternate equipment modules was performed, then the sensitivity analysis for the input parameters of the alternate equipment modules also may be available to the user in a report similar to that of FIG. 20. In the embodiment of the sensitivity report of FIG. 20, the baseline input parameters associated with a respective equipment module that were analyzed are listed in portion 94. Portion 96 illustrates and lists the change in the total baseline cost based upon a one percent increase or a one percent decrease in the value of the respective input parameter. In other embodiments, any other percent change may be utilized. The bar chart and numerical values of portion 96 therefore indicate which input parameters cause the greatest impact on the structure cost. For example, in the embodiment of FIG. 20, the mean time between failure (MTBF) input parameter for the baseline equipment module 1 with a prognostics maintenance approach has the greatest impact on the baseline structure cost. Thus, the sensitivity analysis informs the user that any change to the MTBF input parameter for the baseline equipment module 1 will have a significant impact on the baseline structure cost relative to the other input parameters for which the sensitivity analysis was performed.

The embodiment of FIG. 20 also illustrates that new input parameters associated with the input parameters listed in portion 94 may be specified under the "New Inputs" heading in portion 98. In the embodiment of FIG. 20, the input amounts listed under the "New Inputs" heading initially are the baseline inputs that were utilized for the sensitivity analysis of portion 96, which are listed in FIGS. 9A, 9B and 9C. Alternatively, the area under the "New Inputs" heading may be blank initially. Regardless of whether there is an amount listed initially, a user may enter amounts for one or more of the respective input parameters that are different from the amount used for the sensitivity analysis of portion 96. After entering one or more new input parameter amount associated with one or more respective input parameters, the associated area under the "$Change" heading will automatically display the increase or decrease in the structure cost resulting from the respective new input value and the associated area under the "% Chg" heading will automatically display the percentage the new input value has been increased or decreased from the previous value. In the embodiment of FIG. 20, portion 100 also presents the new total costs due to the one or more new inputs in portion 98 and the percent change in the total cost from the total cost determined using the inputs list in FIGS. 9A, 9B and 9C. To maintain sensitivity accuracy, the method and system 20 of some embodiments of the present invention may indicate that one or more of the input parameters upon which the sensitivity analysis was based should only be increased or decreased within a predefined range. For example, in the embodiment of FIG. 20, the input parameters that have an asterisk next to them should only be increased or decreased within a twenty percent range to ensure that the determinations regarding the associated changes in the total costs are accurate.

FIG. 21 illustrates one embodiment of a cost benefit analysis that may be provided by the method and system 20 of the present invention. The cost benefit analysis details the acquisition and sustaining costs associated with the baseline and alternate cost determinations and the relative benefit or cost of the alternate determinations as compared to the baseline determinations, i.e. the baseline cost minus the alternate cost. Thus, the cost benefit analysis is generally useful only if alternate equipment modules have been specified.

While the analyses described above are generally associated with the examples of processes to perform the analyses described above, further explanation and/or alternative processes to perform the analyses may be described in U.S. Pat. No. 6,532,426 entitled "System and Method for Analyzing Different Scenarios for Operating and Designing Equipment," the contents of which is incorporated by reference in its entirety.

In addition to the analyses described above, any other type of analysis may also be performed based upon the input parameters. For example, a cost impact analysis may be performed, which determines the various components of the total cost impact for the baseline and/or alternate equipment modules and structure. A cost summary graph may be created, which illustrates the various components of the total baseline and/or alternate costs in any form known to those skilled in the art, such as bar chart form. A breakeven analysis may be performed, which determines the amount of time before the baseline or alternate system would provide enough benefits to a buyer of the respective system to equal the cost of the respective system. The internal rate of return on the investment in the respective system also may be determined over the respective system's lifetime. The number of spares required for each equipment module in the baseline and/or alternate system may be determined, such as by utilizing a Poisson distribution, as known to those skilled in the art.

A display of the failure mode distribution used to determine the costs associated with a prognostics maintenance approach, if selected, may be created, which includes the failure mode contribution percentage, the correct predictions percentage and the false alarm percentage. To create the failure mode distribution, a failure mode description, failure mode contribution percentage, prognostics correct failure percentage and false alarm percentage is entered for each failure mode detected by the prognostics. The failure mode description is a brief description of the respective failure mode targeted by the prognostics. The failure mode contribution percentage defines the contribution of each failure mode to the total failures. For example, if the prognostics address only one failure mode, which is 70% of all failure modes, the user enters 70% in the failure mode contribution percentage field and the failure modes not addressed by prognostics are ignored. The system checks to ensure that the sum of all of failure mode contribution percentages for each failure mode entered is less than or equal or 100 percent and may issue an error message if the sum is greater than 100 percent. The prognostic correct failure prediction percentage is the percentage of the failures that are correctly predicted for removal by prognostics for each failure mode. The system checks to ensure that none of the prognostic correct failure prediction percentages for each failure mode are greater than 100 percent and may issue an error message if any of the percentages are greater than 100 percent. The false alarm percentage is the percentage of the total prognostic predicted removals that are falsely predicted for each failure mode. These are the prognostic predicted removals that will be "no fault found (NFF)." False alarms are a percentage of the total predictions made by prognostics. The total prediction is the sum of correct predictions and the false alarms themselves. For example, if there are 80 correct failure predictions, and the False Alarm value is 20%, then in predicting correctly the 80 failures, the prognostics will in addition generate 20 false alarms (80*20%/(100%−20%)). Thus, we will have total prognostic removals of 100 for this failure mode, with 80 being justified prognostic removals and 20 being false alarms (unjustified removals). Furthermore, a cost by equipment module analysis may be performed, which illustrates the operating costs and spares costs of each equipment module having the selected maintenance approach over the lifetime of the structure.

Although the example described above with respect to the figures includes alternate equipment modules and, therefore, an alternate structure design, the alternate equipment modules are not necessary to perform the analyses described above. As such, a user may include only one or more baseline equipment module and perform the above analyses based upon the baseline equipment module(s) and structure only. In addition, although the above example describes selecting between the operate-to-failure maintenance approach, the scheduled maintenance approach, and the prognostics maintenance approach for each equipment module, any other type of maintenance approach known to those skilled in the art may be included. Furthermore, in one embodiment of the method and system 20 of the present invention, the cost evaluations may be performed utilizing the same maintenance approach for each of the equipment modules, such as the prognostics maintenance approach. The user may specifically select the same maintenance approach for each of the equipment modules or the same maintenance approach may be automatically selected for each equipment module.

Thus, the method and system 20 for evaluating costs associated with various maintenance approaches provide accurate and complete quantification of the impact of various design and operational solutions based upon economic factors. In particular, the method and system provide cost evaluation of various maintenance approaches for at least one equipment module that is part of an overall structure in one transaction, instead of many as required by the conventional quantification systems. A baseline and alternate equipment module also may be specified for each equipment module and the costs associated with each of the maintenance approaches for each baseline and alternate equipment module then may be compared. In addition, the costs associated with the overall structure having a chosen maintenance approach for each baseline and alternate equipment module may be evaluated. Furthermore, the method and system of the present invention are capable of calculating the sensitivity of the costs based upon a change in an input parameter, such that the relative impact of certain input parameters on the costs can be determined. Thus, the method and system for evaluating costs associated with various maintenance approaches of the present invention provide accurate and comprehensive analyses of costs associated with various maintenance approaches, such that users save time and arrive at a more optimal design solution than with conventional quantification systems.

The input parameters and/or partial or completed analyses may be stored (blocks 106 and 110), as shown in FIG. 2, for future usage or reference, such as in storage element 28. For example, in one embodiment of the method and system 20 of the present invention, the input parameters and/or partial or completed analyses may be stored in any type of storage element known to those skilled in the art by selecting the "output to workbook" option 102 of FIG. 3 and selecting the desired location to store the input parameters and/or the partial or completed analyses. In addition, the embodiment of the method and system 20 permit a user to select which portions of the input parameters and/or analyses to store. For example, for the embodiment described above, a user may select whether to store the input data, the selected maintenance approach(es) data, the comments, and/or any of the analysis results and reports described above.

In some embodiments of the method and system 20 of the present invention, a user may access further information regarding one or more aspects of the input parameters and/or cost evaluations, such as by selecting the "Help" option 104 of FIG. 3. In addition, a user may exit the system 20 at any time after accessing the system, such as by selecting the "Exit" option of FIG. 3.

In this regard, FIGS. 1-3, 10-15, 17 and 18 are block diagrams, flowcharts or other schematic representations of methods, and systems according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for evaluating costs associated with each of a plurality of maintenance approaches for at least one equipment module of a structure, comprising:
receiving, via a client element, a plurality of parameters comprising parameters regarding the at least one equipment module, the structure, and economic factors related to at least one of the at least one equipment module and the structure, wherein receiving a plurality of parameters regarding the structure comprises receiving information regarding a lifetime of the structure, wherein receiving a plurality of parameters regarding the at least one equipment module comprises receiving at least one parameter regarding at least one first equipment module and at least one parameter regarding at least one second equipment module, wherein each second equipment module is an alternative for a respective first equipment module such that the structure includes only one type of equipment module selected from a group consisting of the first equipment module and the second equipment module;
separately determining, by a processor, equipment module costs associated with each of at least two of the plurality of maintenance approaches for each equipment module based upon the received plurality of parameters, including the economic factors, wherein the plurality of maintenance approaches comprises a prognostic maintenance approach, a scheduled maintenance approach, and an operate-to-failure maintenance approach;
receiving a selection of a maintenance approach for at least one first equipment module and a maintenance approach for at least one second equipment module;
following the selection, determining non-recurring costs for each of the at least one first equipment module having the selected maintenance approach and the at least one second equipment module having the selected maintenance approach,
wherein determining non-recurring costs comprises determining acquisition and training costs associated with each of the at least one first equipment module having the selected maintenance approach and the at least one second equipment module having the selected maintenance approach over the lifetime of the structure, and
comparing by the processor, the equipment module costs and the non-recurring costs associated with the maintenance approach for the first equipment module with the equipment module costs and the non-recurring costs associated with the maintenance approach for the second equipment module, wherein comparing comprises separately presenting, via a display element, the equipment module costs and the non-recurring costs associated with each of the at least two maintenance approaches for each equipment module.

2. The method of claim 1, further comprising:
determining all costs for the structure based upon the selected maintenance approach for each equipment module, wherein determining all costs comprises determining all of the plurality of acquisition and training costs for the structure having the selected maintenance approach for each equipment module; and
presenting all costs of the structure.

3. The method of claim 2, further comprising determining a sensitivity value for at least one of the plurality of parameters following the receipt of the selection of one of the maintenance approaches for each equipment module.

4. The method of claim 3, wherein determining the sensitivity value for a respective parameter comprises determining a change in the costs resulting from a change in the value of the respective parameter by a predefined percentage.

5. The method of claim 3, further comprising:
receiving at least one modified parameter after determining the sensitivity value;
determining costs associated with each of at least two of the plurality of maintenance approaches based upon the received plurality of parameters and the at least one modified parameter;
receiving a selection of one of the maintenance approaches for each equipment module;
determining all costs of the structure based upon the selected maintenance approach for each equipment module; and
determining a modified sensitivity value for at least one of the plurality of parameters, including the at least one modified parameter.

6. The method of claim 2, wherein determining all costs comprises determining net present value life cycle costs for all of the plurality of acquisition and training costs for the structure having the selected maintenance approach for each equipment module.

7. The method of claim 1, further comprising:
receiving a selection of one of the maintenance approaches for each of the first and second equipment modules;
determining first costs of the structure based upon the selected maintenance approach for each first equipment module;

determining second costs of the structure based upon the selected maintenance approach for each second equipment module; and presenting the first and second costs of the structure.

8. The method of claim 1, wherein determining costs comprises determining a net present value life cycle costs for the plurality of acquisition and training costs associated with each maintenance approach for each equipment module.

9. The method of claim 1, further comprising storing the parameters and the costs associated with each of the at least two maintenance approaches for each equipment module.

10. The method of claim 1, wherein determining the costs associated with each of at least two of the plurality of maintenance approaches comprises determining the costs associated with a different maintenance approach for the first equipment module than with the second equipment module.

11. A method for evaluating costs associated with a prognostic maintenance approach for at least one equipment module of a structure, comprising:
receiving, via a client element, a plurality of parameters comprising parameters regarding the at least one equipment module, the structure and economic factors related to at least one of the at least one equipment module and the structure, wherein receiving a plurality of parameters regarding the structure comprises receiving information regarding a lifetime of the structure, wherein receiving a plurality of parameters regarding the at least one equipment module comprises receiving at least one parameter regarding at least one first equipment module and at least one parameter regarding at least one second equipment module wherein each second equipment module is an alternative for a respective first equipment module such that the structure includes only one type of equipment module selected from a group consisting of the first equipment module and the second equipment module;
separately determining, by a processor, equipment module costs associated with a plurality of different maintenance approaches including the prognostic maintenance approach based upon the received plurality of parameters, including the economic factors;
receiving a selection of a maintenance approach for at least one first equipment module and a maintenance approach for at least one second equipment module;
determining non-recurring costs for each of the at least one first equipment module having the selected maintenance approach and the at least one second equipment module having the selected maintenance approach, wherein determining non-recurring costs comprises determining acquisition and training costs associated with each of the at least one first equipment module having the selected maintenance approach and the at least one second equipment module having the selected maintenance approach over the lifetime of the structure; and
comparing, by the processor, the equipment module costs and the non-recurring costs associated with the maintenance approach for the first equipment module with the equipment module costs and the non-recurring costs associated with the maintenance approach for the second equipment module, wherein comparing comprises separately presenting, via a display element, the costs associated with the respective maintenance approach for each equipment module.

12. The method of claim 11, further comprising:
determining all costs of the structure based upon the prognostic maintenance approach for each equipment module, wherein determining all costs comprises determining all of the plurality of acquisition and training costs for the structure having the prognostic maintenance approach for each equipment module; and presenting all costs of the structure.

13. The method of claim 12, further comprising determining a sensitivity value for at least one of the plurality of parameters.

14. The method of claim 13, wherein determining the sensitivity value for a respective parameter comprises determining a change in the costs resulting from a change in the value of the respective parameter by a predefined percentage.

15. The method of claim 13, further comprising:
receiving at least one modified parameter after determining the sensitivity value;
determining costs associated with the prognostic maintenance approach based upon the received plurality of parameters and the at least one modified parameter;
determining all costs for maintenance of the structure based upon the prognostic maintenance approach for each equipment module; and
determining a modified sensitivity value for at least one of the plurality of parameters, including the at least one modified parameter.

16. The method of claim 11, further comprising:
determining first costs of the structure based upon the prognostic maintenance approach for each first equipment module;
determining second costs of the structure based upon the prognostic maintenance approach for each second equipment module; and
presenting the first and second costs of the structure.

17. The method of claim 11, further comprising storing the parameters and the costs associated with each of the prognostic maintenance approaches for each equipment module.

18. A method for evaluating costs associated with a prognostic maintenance approach for at least one equipment module of a structure, comprising:
receiving, via a client element, a plurality of parameters comprising parameters regarding the at least one equipment module, the structure and a plurality of economic factors related to at least one of the at least one equipment module and the structure, wherein receiving a plurality of parameters regarding the at least one equipment module comprises receiving at least one parameter regarding at least one first equipment module and at least one parameter regarding at least one second equipment module, wherein each second equipment module is an alternative for a respective first equipment module such that the structure includes only one type of equipment module selected from a group consisting of the first equipment module and the second equipment module;
separately determining, by a processor, equipment module costs associated with a plurality of different maintenance approaches including the prognostic maintenance approach based upon the received plurality of parameters, including the economic factors;
receiving a selection of a maintenance approach for at least one first equipment module and a maintenance approach for at least one second equipment module;
determining non-recurring costs for each of the at least one first equipment module having the selected maintenance approach and the at least one second equipment module having the selected maintenance approach, wherein determining non-recurring costs comprises determining acquisition and training costs associated with each of the at least one first equipment module having the selected maintenance approach and the at least one second equipment module having the selected maintenance approach the prognostic, wherein determining non-recurring costs comprises determining a net present value life cycle costs for at least the plurality of acquisition and sustaining training costs associated with the respective prognostic maintenance approach for each equipment module; and comparing, by the processor, the equipment module costs and the non-recurring costs associated with the prognostic maintenance approach for the first equipment module with the equipment module costs and the non-recurring costs associated with the prognostic maintenance approach for the second equipment module, wherein comparing comprises separately presenting, via a display element, the costs associated with the maintenance approach for each equipment module.

19. A system for evaluating costs associated with each of a plurality of maintenance approaches for at least one equipment module of a structure, comprising:

a computer, comprising:
a client element capable of receiving a plurality of parameters comprising parameters regarding the at least one equipment module, the structure and economic factors related to at least one of the at least one equipment module and the structure, wherein said client element is also configured to receive information regarding a lifetime of the structure, wherein said client element is also configured to receive at least one parameter regarding at least one first equipment module and at least one parameter regarding at least one second equipment module, wherein each second equipment module is an alternative for a respective first equipment module such that the structure includes only one type of equipment module selected from a group consisting of the first equipment module and the second equipment module;
a processor capable of separately determining equipment module costs associated with each of at least two of the plurality of maintenance approaches based upon the received plurality of parameters, including the economic factors, wherein the plurality of maintenance approaches comprises a prognostic maintenance approach, a scheduled maintenance approach, and an operate-to-failure maintenance approach for each equipment module, wherein the processing element is also configured to receive a selection of a maintenance approach for at least one first equipment module and a maintenance approach for at least one second equipment module, and wherein the processing element is further configured to determine, following the selection, non\-recurring costs for each of the at least one first equipment module having the selected maintenance approach and the at least one second equipment module having the selected maintenance approach, wherein the processing element is configured to determine non-recurring costs of including acquisition and training costs associated with each of the at least one first equipment module having the selected maintenance approach and the at least one second equipment module having the selected maintenance approach maintenance approach for each equipment module over the lifetime of the structure, and wherein the processing element is further configured to compare the equipment module costs and the non-recurring costs associated with the maintenance approach for the first equipment module with the equipment module costs and the non-recurring costs associated with the maintenance approach for the second equipment module; and a display capable of separately presenting the equipment module costs and the non-recurring costs associated with each of the at least two maintenance approaches for each equipment module.

20. The system of claim 19, wherein said processor is also capable of determining all costs of the structure based upon the selected maintenance approach for each equipment module, wherein all costs comprises all of the plurality of acquisition and training costs for the structure having the selected maintenance approach for each equipment module, and wherein said display is also capable of presenting all costs of the structure.

21. The system of claim 20, wherein said processor is further capable of determining a sensitivity value for at least one of the plurality of parameters following the receipt of the selection of one of the maintenance approaches for each equipment module.

22. The system of claim 21, wherein said processor is also capable of determining the sensitivity value by determining a change in the costs resulting from a change in the value of the respective parameter by a predefined percentage.

23. The system of claim 21, wherein said client element is also capable of receiving at least one modified parameter after determining the sensitivity value, and
wherein said client element is further capable of receiving a selection of one of the maintenance approaches for each equipment module,
wherein said processor is also capable of determining costs associated with each of at least two of the plurality of maintenance approaches based upon the received plurality of parameters and the at least one modified parameter,
wherein said processor is further capable of determining all costs of the structure based upon the selected maintenance approach for each equipment module, and wherein said processor is also capable of determining a modified sensitivity value for at least one of the plurality of parameters, including the at least one modified parameter.

24. The system of claim 19, wherein said processor is also capable of determining first costs of the structure based upon the selected maintenance approach for each first equipment module and second costs of the structure based upon the selected maintenance approach for each second equipment module, and
wherein said display is also capable of presenting the first and second costs of the structure.

25. The system of claim 19, wherein said processor is also capable of determining a net present value life cycle costs for the plurality of acquisition and training costs associated with each maintenance approach for each equipment module.

26. The system of claim 19, further comprising a storage element capable of storing the parameters and the costs associated with each of the at least two maintenance approaches for each equipment module.

27. The system of claim 19, wherein the processor is configured to determine the costs associated with each of at least two of the plurality of maintenance approaches by determining the costs associated with a different maintenance approach for the first equipment module than with the second equipment module.

* * * * *